United States Patent [19]

Shionoya et al.

[11] Patent Number: 5,452,382
[45] Date of Patent: Sep. 19, 1995

[54] OPTICAL WAVEGUIDE DEVICE AND OPTICAL MICROSCOPE USING THE SAME

[75] Inventors: Takashi Shionoya, Tokyo; Jun Iwasaki, Kanagawa; Hiroshi Ohki, Kanagawa; Masaaki Doi, Kanagawa, all of Japan

[73] Assignee: Nikon Corporation, Tokyo, Japan

[21] Appl. No.: 232,192

[22] PCT Filed: Jul. 25, 1994

[86] PCT No.: PCT/JP93/01264

§ 371 Date: May 4, 1994

§ 102(e) Date: May 4, 1994

[87] PCT Pub. No.: WO94/06041

PCT Pub. Date: Mar. 17, 1994

[30] Foreign Application Priority Data

Sep. 7, 1992 [JP] Japan ................ 4-262725
Nov. 24, 1992 [JP] Japan ................ 4-313198
Jul. 7, 1993 [JP] Japan ................ 5-167665

[51] Int. Cl.⁶ ........................ G02B 6/27; G02B 21/00
[52] U.S. Cl. ........................ 385/11; 385/14; 385/27; 385/28; 385/40; 385/45; 385/132; 385/141; 359/368; 359/371
[58] Field of Search ........ 385/2, 8, 9, 11, 14, 385/12, 27, 28, 40, 45, 46, 122, 129, 130, 131, 132, 141, 142, 144; 359/368, 370, 371

[56] References Cited

U.S. PATENT DOCUMENTS

| | | | |
|---|---|---|---|
| 4,775,208 | 10/1988 | Robinson et al. | 385/40 X |
| 4,778,234 | 10/1988 | Papuchon et al. | 385/132 |
| 5,078,482 | 1/1992 | Feldman et al. | 359/371 |
| 5,151,957 | 9/1992 | Riviere | 385/41 |
| 5,162,648 | 11/1992 | Iwasaki | 359/371 X |
| 5,195,152 | 3/1993 | Gupta | 385/49 |
| 5,239,598 | 8/1993 | Wight et al. | 385/8 |
| 5,285,507 | 2/1994 | Van der Tol | 385/11 |
| 5,289,454 | 2/1994 | Mohapatra et al. | 385/132 |
| 5,355,252 | 10/1994 | Haraguchi | 359/369 |
| 5,375,178 | 12/1994 | Van der Tol | 385/11 |

FOREIGN PATENT DOCUMENTS

| | | | |
|---|---|---|---|
| 62-36608 | 2/1987 | Japan | 385/11 X |
| 4-208913 | 7/1992 | Japan | 385/11 X |
| 4-107409 | 4/1994 | Japan | 385/11 X |

OTHER PUBLICATIONS

H. Ooki et al. "A Novel type of Laser Scanning Microscope: Theoretical Considerations". Optics Communications, vol. 85, No. 2, 3; Sep. 1991, pp. 177-182.

R. Juskaitis et al. "Surface Profiling With Scanning Optical Microscopes Using Two-Mode Optical Fibers", Applied Optics, vol. 31, No. 22' Aug. 1992, pp. 4569-4574.

Primary Examiner—Brian Healy
Attorney, Agent, or Firm—Keck, Mahin & Cate

[57] ABSTRACT

An optical waveguide device formed by a material showing anisotropy for refraction index and an optical instrument using the same device. The device comprises an electro-optic single crystal substrate on which are formed a first core portion higher in refractive index than the substrate with respect to both ordinary and extraordinary rays and a second core portion higher in refractive index than the substrate with respect to extraordinary rays pnly whereby the first core portion forms a single-moded waveguide for ordinary rays, and the overlapping region of the first and second core portions forms a double-moded waveguide for extraordinary rays. This optical waveguide device is used in place of a pinhole elementin an optical system of a confocal scanning optical microscopeso as to guide illuminating light to an object to be detected and to guide the reflected light from the object into a detector. This microscope includes a polarization conversion element for converting the polarizing direction of the illuminating light to one different from that of reflected light. The optical waveguide device functions as a single-moded waveguide for the illuminating light and as a double-moded waveguide for the reflected light.

28 Claims, 10 Drawing Sheets

OPTICAL WAVEGUIDE DEVICE AND OPTICAL MICROSCOPE USING THE SAME

TECHNICAL FIELD

The present invention relates to an optical waveguide device and an optical instrument using the same.

BACKGROUND ART

Recently, the optical waveguide device has attracted notice in the field of various optical instruments, particularly optical measuring instruments for obtaining information relating to the phase and amplitude of the surface of an object to be detected. The reason resides in its advantage taht the use of an optical waveguide has the effect of reducing the size and weight of an optical system and eliminating the need to adjust the optical axis.

Depending on the difference in refractive index between the light guide core and the cladding forming the optical waveguide, the waveguide width, the refractive index distribution, etc., the various optical waveguides are divided into the following classes, that is, the single-moded waveguides in which only the 0-order moded beam is excited, the double-moded waveguides in which the 0-order and first-order moded beams are excited and the multi-moded waveguides in which at least three beams of the 0-order, first-order and second-order modes or over are excited.

For instance, a confocal laser scanning microscope in which mode interference in a double-moded waveguide is utilized to obtain a differential interference image of the surface of an object to be detected, is disclosed in the paper by H. Ooki et al; "A novel type of laser scanning microscope: theoretical considerations" Optics Communications, vol. 85, No. 2, 3; September 1991, pp 177–182.

With the optical instrument described in this paper, when a laser beam is incident to the double-moded waveguide, a 0-order moded beam and a first-order moded beam are excited in accordance with the amplitude distribution of the incident laser beam. The two moded beams interfer with each other in the waveguide thus causing the light intensity distribution in the waveguide to become asymmetrical. By preliminarily choosing the length of the double-moded waveguide to be optimum and putting forth two branch waveguides from one end of the double-moded waveguide, information relating to the asymmetry of the light intensity distribution in the double-moded waveguide can be obtained by detecting the difference in intensity between the light beams emitted from the branched two branch waveguides. It is considered that the asymmetry of the light intensity distribution in the waveguide is due, on one hand, to the asymmetry of the intensity distribution of the incident laser beam and, on the other hand, to the asymmetry of the phase distribution of the incident laser beam. By optimally selecting the length of the double-moded waveguide, it is possible to detect either of the asymmetric distributions. The information relating to the asymmetry of the intensity distribution can be used in the measurement of the distribution of light reflectance on an object surface to be detected and the information relating to the asymmetry of the phase distribution can be used in the measurement of the inclination, unevenness, height or the like of the object surface.

On the other hand, a laser scanning microscope for detecting the displacement in the optical axis direction (the deviation from in-focus) of an incident laser beam by utilizing the interference of modes in a double-moded waveguide made of an optical fiber is disclosed in the paper of R. Juskaitis et al; "Surface profiling with scanning optical microscopes using two-mode optical fibers", Applied Optics, vol. 31, No. 22; August 1992, pp 4569–4574.

The optical instrument described in this paper is of the construction in which the incident position of a laser spot is off the center of the end bace of a double-moded optical fiber. Where the laser spot is out of focus, the equiphase surface of the incident light to the optical fiber is inclined. This inclination cases asymmetry to appear in the phase distribution of the incident light to the optical fiber. The deviation from in-focus (the focusing position) is measured by detecting the asymmetry of the phase distribution.

In this optical instrument using the optical fiber, its light source and the optical fiber are separately arranged and therefore the alignment of the incident light with the optical fiber is difficult. Also, due to the use of the optical fiber, it is difficult to choose the length of the double-moded waveguide to be optimum. In view of these reasons, this optical instrument cannot ensure such a high degree of measuring accuracy as expected.

Also, a confocal laser scanning microscope using an optical waveguide device to separately obtain the phase information and amplitude information of an object surface to be detected is disclosed in Japanese Laid-Open Patent Application JP-A 4-208913 publicly made open on Jul. 30, 1992.

This confocal laser scanning microscope includes a channel waveguide device at the position of a spot image formed by a condensing optical system from the reflected light from an object surface to be detected. This optical waveguide device includes a double-moded waveguide having its end face positioned at the spot image position, and a single-moded waveguide for directing the illuminating light from the light source to the optical path to the object surface through the end face. The single-mode waveguide is arranged in a positional relation such that its center is aligned with the center of the double-moded waveguide whereby due to the light incident to the double-moded waveguide from the single-moded waveguide, only the 0-order moded beam is excited and a spot illuminating light having an intensity of a normal distribution and a phase of a normal distribution is emitted from the end face of the double-moded waveguide toward the object surface to be detected.

In this case, extremely sophiscated manufacturing techniques are required for the manufacture of an optical waveguide device in which a single-moded waveguide and a double-moded waveguide are in a positional relation such that their centers are aligned with each other.

DISCLOSURE OF INVENTION

It is the primary object of the present invention to provide an optical waveguide device which is relatively easy to manufacture and which is capable of selectively functioning as a single-moded waveguide or a double-moded waveguide depending on the polarizing direction of light.

It is another object of the present invention to provide an optical instrument utilizing such optical waveguide device and more particularly an optical interference microscope system so designed that an optical waveguide device and an external optical system can be easily assembled, that an illuminating light can be propagated only in a 0-order mode, that the need for the alignment between the incident position of a reflected light from an object surface to be detected and the waveguide end bace is eliminated and that differential amplitude and phase information of the object surface can be obtained with a high degree of accuracy.

In accordance with one aspect of the present invention, there is thus provided an optical waveguide device in which formed along the surface of a single crystal substrate having an electro-optic effect is an optical waveguide made of a light guide core of greater refractive index than the substrate and ordinary and extraordinary rays are guided by the optical waveguide. The core of the optical waveguide device includes a first core portion which is greater in refractive index than the substrate with respect to either of the ordinary and extraordinary rays and a second core portion which is greater in refractive index than the substrate with respect to the extraordinary ray alone.

The substrate is preferably made of a dielectric crystal having an electro-optic effect.

In accordance with another aspect of the present invention, the optical waveguide of the device include:
a first single-moded waveguide formed by the first core portion and adapted to propagate the ordinary ray in the first mode,
a double-moded waveguide formed by the first and second core portions and adapted to propagate the extraordinary ray in the double mode, and
an optical port including one end face of the first core portion and one end face of the second core portion at the end face of the double-moded waveguide.

This optical waveguide device may further include electrode means for applying a predetermined voltage to the double-moded waveguide.

In accordance with another preferred modified aspect of the optical waveguide device, the center of the single-moded waveguide and the center of the double-moded waveguide are displaced from each other within the optical port.

In accordance with still another aspect of the present invention, the optical waveguide device further includes:
a second single-moded waveguide formed by the first core portion and adapted to externally guide an ordinary ray to the first single-moded waveguide, and
third and fourth single-moded waveguides formed by the second core portion and adapted to divide the extraordinary ray in the double-moded waveguide into two parts according to its light intensity distribution and guide to the outside.

In accordance with still another aspect of the present invention there is provided an optical waveguide device in which along the surface of a single crystal substrate having an electro-optic effect is an optical waveguide formed by a light guide core higher in refractive index than the substrate to guide light in a first direction from one end to the other end of the optical waveguide and in a second direction from the other end to the one end of the optical waveguide. The optical waveguide of the optical waveguide device includes a single-moded waveguide for propagating the light of the first direction in the single mode, a double-moded waveguide for propagating the light of the second direction in the double mode, and an optical port including one end face of the single-moded waveguide and one end face of the double-moded waveguide altogether, and the center of the single-moded waveguide and the center of the double-moded waveguide are displaced from each other within the optical port.

The optical waveguide device according to this aspect can also further include electrode means for applying an electric field to the double-mode waveguide.

Also, in accordance with a preferred modified aspect the optical waveguide device further includes a second single-mode waveguide for guiding an external light to the first single-moded waveguide along the first direction, and third and fourth single-moded waveguides whereby the light beam propagated along the second direction in the double-moded waveguide is divided into two parts according to its light intensity distribution and guided to the outside.

With the optical waveguide device according to the present invention, the single crystal substrate having an electro-optic effect constitutes the cladding portion for the respective core portions and a lithium niobate single crystal, lithium tantalate single crystal, etc., may for example be used as the suitable materials for the substrate. These single crystals have been widely used as substrate materials for the manufacture of optical waveguides. A number of methods have been known for the production of optical waveguides on a lithium niobate single crystal substrate or a lithium tantalate single crystal substrate and such production methods used widely include a thermal diffusion process, a proton exchange process and lithium oxide ($Li_2O$) outdiffusion process.

With the optical waveguide device according to the present invention, the first core portion should preferably be formed by the thermal diffusion process, that is, it should preferably be formed by thermally diffusing a given metal into a predetermined region of the substrate forming the cladding and thereby increasing the refractive index. Also, the second core portion should preferably be formed by the proton exchange process, that is, by immersing the substrate in a solution containing the ions of a preselected nuclide and exchanging the ions in the substrate with the ions in the solution to thereby increase the refractive index or alternatively it should preferably be formed by the $Li_2O$ outdiffusion process or the technique of heating the substrate to diffuse $Li_2O$ to the outside of the substrate and thereby to increase the refractive index.

The thermal diffusion method is a method of depositing a material to be thermally diffused on the substrate and heating the substrate for a given period of time in a high temperature furnace to diffuse the deposited material into the substrate and thereby to form a high refractive index region (a core portion). As the diffusion source, transition metals such as Ti, V, Ni and Cu may be used in the case of the lithium niobate single crystal substrate and also such transition metals as Cu, Ti and Nb may be used in the case of the lithium tantalate single crystal substrate.

The proton exchange process is a method of immersing the substrate in a solution containing the ions of a given nuclide and exchanging the ions in the substrate with the ions in the solution to thereby form a high refractive index region (a core portion) in the vicinity of the substrate surface. As the solution, solutions of benzonic acid, silver nitrate, pyrophosphoric acid, etc., may be used. The waveguide produced by the proton exchange process can be varied in refractive index and refractive index distribution by hot annealing.

The $Li_2O$ outdiffusion process is a method of heating the substrate to an elevated temperature and discharging $Li_2O$ from the crystal surface to the outside to thereby form a high refractive index portion (a core portion).

Of these processes, the thermal diffusion process increases both the refractive index for the ordinary ray and the refractive index for the extraordinary ray, whereas the proton exchange process and the $Li_2O$ outdiffusion process increase only the refractive index for the extraordinary ray.

Thus, by forming by the thermal diffusion process a region of high refraction for both the ordinary and extraordinary rays (a first core portion) on the substrate and by forming a region having a high refractive index only for the extraordinary ray (a second core portion) in the area on each side of the first core portion formed by the thermal diffusion process or in a wider region than the first core portion on the upper surface by the proton exchange process (including the annealing operation) or the $Li_2O$ outdiffusion process, it is possible to separately form the region forming a waveguide for the ordinary ray and the region forming a waveguide for the extraordinary ray as the regions which are higher in refractive index than the substrate.

In this case, the refractive indices and the refractive index distributions of the first and second core portions can be suitably adjusted so that the first core portion serves as a single-moded waveguide for the ordinary ray and the area combining the first and second core portions serve as a double-moded waveguide for the extraordinary ray. In other words, it is possible to produce optical waveguides each adapted to selectively function as a single-moded waveguide or a double-moded waveguide depending on the direction of polarization of the light.

It is to be noted that the adjustment of the refractive indices and the refractive index distributions can be effected by suitably selecting the conditions such as the processing times and temperatures of the above-mentioned heat treatment and the proton exchange, the time and temperature of the annealing treatment and the extent of the regions where the thermal diffusion and the proton exchange are performed.

While such optical waveguide having the same function as the optical waveguide device according to the present invention can be produced by using an optical material exhibiting a double refraction phenomenon, where a waveguide is made of a material showing a double refraction phenomenon, it is necessary to accurately confine the waveguide width within a certain range according to the refractive indices of the waveguide and in actuality this involves considerable difficulties from the standpoint of the manufacturing techniques.

The optical waveguide device according to the present invention has novel functions which are nonexistent in the past and therefore the present invention also provides various optical instruments which utilize this novel type of optical waveguide device.

In other words, in accordance with another aspect of the present invention there is provided an optical instrument including the optical waveguide device for guiding the ordinary and extraordinary rays by the optical waveguides formed along the surface of the single crystal substrate having an electro-optic effect by the light guide core of a higher refractive index than that of the substrate, and this optical waveguide device includes a first single-moded waveguide formed by the first core portion to propagate the ordinary ray in the single mode, a double-moded waveguide formed by the first core portion and the second core portion to propagate the extraordinary ray in the double mode, and an optical port including one end face of the first core portion and one end face of the second core portion at one end face of the double-moded waveguide.

The optical instrument further includes:
  illuminating means for projecting an illuminating light to the single-moded waveguide of the optical waveguide device,
  first condensing means for condensing the ordinary ray emitted from the optical port on the surface of a predetermined object to be detected,
  second condensing means for condensing the reflected light from the object surface on the optical port,
  polarizing means arranged between the optical port and the object surface whereby the direction of polarization of the ordinary ray from the optical port and the direction of polarization of the reflected light from the object surface cross each other at right angles,
  measuring means for measuring the light intensity distribution of the reflected light in the double-moded waveguide, and
  detecting means for detecting a deviation from in-focus of the ordinary ray condensed on the object surface by the first condensing means from the result of the measurement by the measuring means.

Preferably, the optical instrument further includes electrode means for applying a predetermined electric field to the double-moded waveguide.

In accordance with a modified aspect of the optical instrument, the center of the single-moded waveguide and the center of the double-moded waveguide are shifted from each other within the optical port.

In accordance with another modified form of the optical instrument, the optical waveguide device further includes:
  a second single-moded waveguide formed by the first core portion to guide the ordinary ray from the illuminating means to the single-moded waveguide, and
  third and fourth single-moded waveguides formed by the second core portion whereby the extraordinary ray in the reflected light in the double-moded waveguide is divided into two parts according to its light intensity distribution and guided to the measuring means.

In this case, the measuring means includes a pair of detectors for separately detecting the intensities of the extraordinary rays emitted from the third and fourth single-moded waveguides.

Also, the optical instrument according to this aspect can further include scanning means for moving the position of a condensed light spot produced on the object surface by the first condensing means, and observation means for observing unevenness of the object surface in accordance with the output signals from the detecting means and a signal indicative of the scanning position by the scanning means.

An optical instrument according to another aspect of the present invention includes an optical waveguide device for guiding light in a first direction extending from one end to the other end of an optical waveguide formed along the surface of a single crystal substrate having an electro-optic effect by a light guide core having a higher refractive index than that of the substrate and in a second direction extending from the other end to the one end of the optical waveguide. The optical waveguide of the optical waveguide device includes a single-moded waveguide for propagating the light of the first direction in the single mode, a double-moded waveguide for propagating the light of the second direction in the double mode and an optical port including one end face of the single-moded waveguide and one end face of the double-moded waveguide, and the center of the single-moded waveguide and the center of the double-moded waveguide are shifted from each other within the optical port.

This optical instrument further includes:

illuminating means for projecting an illuminating light to the single-moded waveguide along the first direction to emit the illuminating light from the optical port, first condensing means for condensing the illuminating light emitted from the optical port on the surface of a predetermined object to be detected, second condensing means for condensing a reflected light from the object surface on the optical port and propagating it along the second direction in the double-moded waveguide, polarizing means arranged between the optical port and the object surface whereby the direction of polarization of the illuminating light from the optical port and the direction of polarization of the reflected light from the object surface cross each other at right angles, measuring means for measuring the light intensity distribution of the reflected light in the double-moded waveguide, and detecting means for detecting a deviation from in-focus of the illuminating light condensed on the object surface by the first condensing means from the result of the measurement by the measuring means.

The optical instrument according to this aspect can further include electrode means for applying an electric field to the double-moded waveguide.

In accordance with a modified form of this optical instrument, the optical waveguide can further include a second single-moded waveguide for guiding the light from the illuminating means to the single-moded waveguide along the first direction, and third and fourth single-moded waveguides for dividing the light propagating in the second direction in the double-moded waveguide into two parts according to its light intensity distribution and guiding to the outside; in this case, the measuring means includes a pair of detectors for separately detecting the intensities of the light emitted from the third and fourth single-moded waveguides.

In accordance with still another modified form of the optical instrument, it can further include scanning means for moving the position of the condensed light spot condensed on the object surface by the first condensing means, and observation means for observing nuevenness of the object surface in accordance with the output signals from the detecting means and a signal indicating the scanning position by the scanning means.

With the above-described optical instrument according to the present invention, the optical waveguide device including the optical waveguide which selectively functions as the single-moded waveguide or the double-moded waveguide depending on the direction of polarization of light is combined with the polarizing means (e.g., a quarter-wave plate) so that the polarizing direction of the light in the first direction and the polarizing direction of the light in the second direction are orientated to cross each other at right angles and therefore the need for positioning the incident position of the reflected light from the object surface with respect to the waveguide is eliminated, thereby ensuring the incidence of the reflected light to the waveguide with a high degree of accuracy. Here, the first direction is a direction in which the light from the light source is propagated toward the object surface and the second direction is a direction in which the reflected light from the object surface is propagated toward the measuring means.

Also, the production of the double-moded waveguide can be carried out easily and accurately by utilizing the well known semiconductor manufacturing techniques and therefore it is possible to relatively easily produce an optical instrument which is high in measuring accuracy.

Also, by applying a controlled electric field to the waveguide formed in the single crystal substrate having an electro-optic effect, it is possible to vary the effective length of the waveguide and thereby to adjust the perfect coupling length of the waveguide to a desired value.

Here, the perfect coupling length means the minimum value of the waveguide effective length at which the phase difference between the 0-order moded beam and the first-order moded beam prepagating through the double-moded region of the waveguide becomes $\pi$ radians. While the effective length of the double-moded region can be determined by the effective length of the double-moded waveguide, in the case of a double-moded waveguide having Y-branched two single-moded waveguides, for example, if the angle of the Y-branching between the single-moded waveguides is small, there is the possibility of producing a coupling region which causes photo coupling between the single-moded waveguides. This is based on the fact that the light propagating through the waveguides leaks to the cladding (substrate), thereby causing photo coupling between the adjoining two waveguides. In such coupling region, there is the coexistence of an even-moded beam and an odd-moded beam and these two modes respectively correspond to the 0-order moded beam and the first-order mode beam in the double-moded waveguide. Therefore, in the coupling region interference is caused between the even-moded beam and the off-moded beam and this causes transfer of light power between the Y-branched two single-moded waveguides. This can be considered in the same sense as the interference between the 0-order moded beam and the first-order moded beam in the double-moded waveguide. As a result, in such a case the effective length of the double-moded region assumes a value corresponding to the sum of the effective length of the double-moded waveguide and a length of propagation of the light in the two modes effected as a result of the photo coupling between the branched two single-moded waveguides.

Assuming that $L_c$ represents the perfect coupling length of the two mode beams, in order to permit observation of the phase distribution of the object surface, it is necessary that the effective length L of the double-moded region be given as follows $$L = L_c(2m+1)/2 \quad (m = 0, 1, 2, \ldots) \tag{1}$$

whereas in order to permit observation of the light intensity distribution of the object surface, it is necessary that the effective length L be given as follows $$L = m \cdot L_c \quad (m = 1, 2, \ldots) \tag{2}$$

Where the effective length of the double-moded region fails to completely coincides with the desired value, it is only necessary to adjust as mentioned previously the electric field applied to the double-moded waveguide to vary its perfect coupling length.

By reducing as far as possible the branching angle of the Y-branching connecting the double-moded waveguide and the two single-moded waveguides, it is possible to enhance the contrast of detection signals and thereby to accurately detect the asymmetry of the light intensity distribution in the double-moded region. This is due to the fact that while, in the double-moded waveguide the peak positions in the electric field distribution of the 0-order moded beam and the first-order moded beam are different in the width direction of the waveguide when they interfer with each other and thus the interference is not easy to occur, in the region where there is the photo coupling between the two single-moded waveguides as mentioned previously, the peak positions in the electric field distributions of the even-moded beam (the 0-order moded beam) and the odd-moded beam (the first-order moded beam) can be caused to coincide thus causing the interference to occur efficiently. Therefore, two or more single-moded waveguides should preferably be connected to the double-moded waveguide through a branch portion having as small branch angle as possible.

In accordance with still another aspect of the present invention there is provided a confocal laser scanning optical microscope for obtaining a differential interference image of an object surface to be detected, and the microscope includes:

illuminating means for projecting an illuminating light containing a first linearly polarized component of a predetermined first polarizing direction, detecting means for detecting a reflected light from the object surface to be detected, an optical waveguide device for guiding the illuminating light from the illuminating means toward the object surface and guiding the reflected light from the object surface toward the detecting means, and polarized light converting means arranged between the optical waveguide device and the object surface whereby the first linearly polarized component of the illuminating light passed through the optical waveguide device is converted to a circularly polarized light and the circularly polarized component contained in the reflected light from the object surface is converted to a second linearly polarized light of a second polarizing direction which is different from the first polarizing direction, said optical waveguide device including:

a main waveguide having at one end thereof a first optical port optically coupled to the polarized light converting means, a branching portion for dividing the other end of the main waveguide into three branch waveguides, said three branch waveguides including a central waveguide having at its terminal end a second optical port optically coupled to the illuminating means, a first side branch waveguide arranged on one side of the central branch waveguide and having at its terminal end a third optical port coptically coupled to the detecting means, and a second branch waveguide arranged on the other side of the central branch waveguide and having at its terminal end a fourth optical port optically coupled to the detecting means, said central branch waveguide being bormed as a single-moded waveguide whereby the first linearly polarized component received at the second optical port is guided in the single mode and transmitted to the main waveguide, said main waveguide being formed so that for the first linearly polarized component of the illuminating light transmitted from the central branch waveguide it serves as a single-moded waveguide to guide the component in the single mode and emit through the first optical port and for the second linearly polarized light of the reflected light incident to the first optical port from the polarized light converting means it serves as a double-moded waveguide to propagate the polarized light in the double mode and transmit to the branching portion, said branching portion distributing the second linearly polarized light transmitted from the main waveguide to the first side branch waveguide and the second side branch waveguide in accordance with its light intensity distribution, and said first and second side branch waveguides respectively transmitting detection light corresponding to the light intensities of the second linearly polarized light distributed by the branching portion to the detecting means through the third and fourth optical ports.

In the confocal laser scanning optical microscope according to one modified form, the main waveguide is composed of at least three materials including an anisotropic material which functions as a core for one of the first and second polarizing directions and which functions as a cladding for the other of the two polarizing directions.

In the confocal laser scanning optical microscope according to another modified form, the illuminating means includes a light source, and polarizing means whereby of the light emitted from the light source only a linearly polarized light in the first polarizing light is transmitted.

Preferably, the central branch waveguide includes means for preventing the second linearly polarized light arriving at the first optical port from falling as a backward light on the illuminating means.

In the confocal laser scanning optical microscope according to another modified form, the main waveguide includes:

an $LiNbO_3$ single crystal adapted to function as a cladding, and an $LiNbO_3$ single crystal having a predetermined transition metal diffused thereinto and adapted to function as a core.

In the confocal laser scanning optical microscope according to another preferred modified form, the main waveguide includes:

an $LiNbO_3$ single crystal adapted to function as a cladding for the first linearly polarized light and the second linearly polarized light, an $LiNbO_3$ single crystal having a predetermined transition metal diffused thereinto and adapted to function as a core for the first linearly polarized light and the second linearly polarized light, and a proton-exchanged $LiNbO_3$ single crystal adapted to function as a cladding for the first linearly polarized light and to function as a core for the second linearly polarized light.

In the confocal laser scanning optical microscope according to still another preferred form, the length L extending from one end to the other end of the main waveguide and the complete coupling length $L_c$ of the even mode and the odd mode for the second linearly polarized light in the main waveguide satisfies either of the relations of the previously mentioned following equations (1) and (2)

$$L = m \cdot L_c (m=1, 2, 3, \ldots)$$

$$L = L_c(2m+1)/2 (m=0, 1, 2, \ldots)$$

In the confocal laser scanning optical microscope according to still another preferred form, the optical waveguide device further includes electrode means for applying an electric field to the main waveguide, and the main waveguide is made of a material having an electro-optic effect whereby the complete coupling length $L_c$ of the even mode and the odd mode for the second linearly polarized light in the main waveguide can be changed by the application of the electric field to a first controlled perfect coupling length $L_{C1}$ and a second controlled perfect coupling length $L_{C2}$, and the length L from the one end to the other end of the main waveguide and the first controlled perfect coupling length $L_{C1}$ or the second controlled perfect coupling length $L_{C2}$ satisfy the relation of the following equation (3) or (4)

$$L = m \cdot L_{C1} (m=1, 2, 3, \ldots) \quad (3)$$

$$L = L_{C2}(2m+1)/2 (m=0, 1, 2, \ldots) \quad (4)$$

In the confocal laser scanning optical microscope according to the present invention, the light illuminating an object surface to be detected and the reflected light from the object surface are propagated in the form of polarized light of different polarizing directions through the main waveguide. The main waveguide is made of a material which is anisotropic in refractive index and it is formed as a waveguide of such orientation that the refractive index for the polarized light of the reflected light is higher than the refractive index for the polarized light of the illuminating light. As a result, the main waveguide functions as a single-moded waveguide for the illuminating light (ordinary ray) and it functions as a double-moded waveguide for the reflected light (extraordinary ray) from the object surface.

Thus, the main waveguide always functions as a single-moded waveguide for the illuminating light so that there is no danger of exciting the odd-moded beam and the illuminating light is always propagated only in the 0-order mode thereby illuminating the object surface by a spot whose light amount and phase are in the normal distribution. Also, as regards the joint between the central branch waveguide and the main waveguide, it is suffice that the joint is of a structure which permits the efficient transmission of propagating light and there is no need to produce it with strict accuracy, thus making it possible to produce the joint with relative ease by use of the heretofore known manufacturing techniques.

On the other hand, the main waveguide always functions as a double-moded waveguide for the reflected light from the object surface and in the main waveguide the 0-order moded beam and the first-order moded beam of the reflected light interfer with each other. The resulting interference beam is distributed through the branching portion into the two branch waveguides or the first and second branch waveguides so that the distributed beams respectively propagate through the first and second branch waveguides and are detected by the detecting means. The detecting means obtains differential information of the object surface from the difference in light amount between the beam propagated through the first branch waveguide and the beam propagated through the second branch waveguide.

The above and other features and advantages of the present invention will become more apparent from the following description of some preferred embodiments shown only for illustrative purposes without any intention of limitation when taken in conjunction with the accompanying drawings.

BEST MODE FOR CARRYING OUT THE INVENTION

Figure 1:
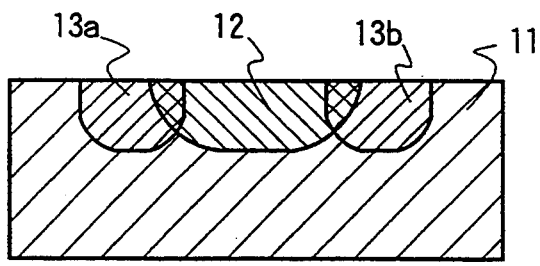
FIG. 1 is a longitudinal sectional view showing schematically the construction of a principal part of an optical waveguide device according to a first embodiment of the present invention.

In an optical waveguide device according to a first embodiment of the present invention which has a longitudinal sectional construction as shown in FIG. 1, the device is constructed by using a substrate 11 made of lithium niobate (LiNbO$_3$) single crystal as a cladding. Provided in the surface of the substrate 11 are a first core portion 12 formed by the thermal diffusion of titanium (Ti) and having a higher refractive index than the substrate for both of the ordinary ray and the extraordinary ray, and second core portions 13a and 13b on the sides of the first core portion 12 by a portion exchange treatment and the following annealing to have a higher refractive index than the substrate with respect to the extraordinary ray alone. Due to the fact that the refractive index distributions of these portions are adjusted, the first core portion 12 constitutes a single-moded waveguide for the ordinary ray and the region combining the first core portion 12 and the second core potions 13a and 13b together constitutes a double-moded waveguide for the extraordinary ray.

Figure 2A:
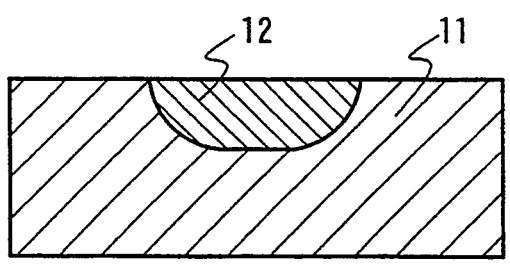
FIGS. 2a, 2b and 2c are schematic sectional views showing in due order the production operations of the optical waveguide device of FIG. 1.
Figure 2B:
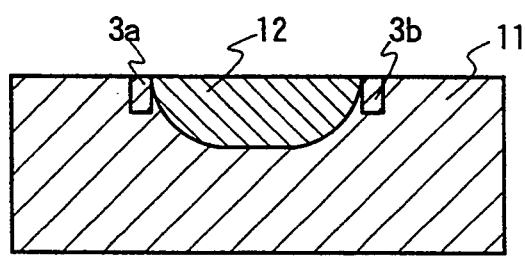
Figure 2C:
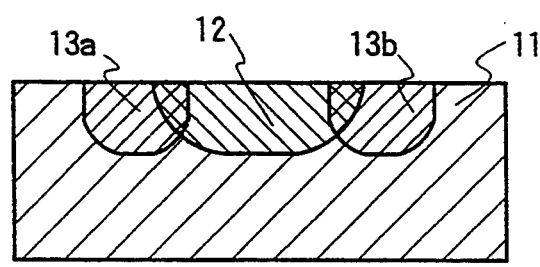

The production of this optical waveguide device will now be described with reference to FIGS. 2a, 2b and 2c schematically showing the constructions at the sections crossing the waveguide at right angles.

Referring first to FIG. 2a, there is illustrated a sectional view schematically showing the resulting condition after the diffusion of Ti into the limited region of the surface of the lithium niobate single crystal substate 11. The first core portion 12 is formed by first forming a Ti film of waveguide pattern on the lithium niobate single crystal substrate 11 and then heating the substrate 11 to diffuse Ti into the limited region in the substrate 11. The first core portion 12 is produced so that the refractive index for the ordinary ray and the refractive index for the extraordinary ray are both increased over the substrate and it serves as a single-moded waveguide for the ordinary ray as well as the extraordinary ray. It is to be noted that in this embodiment the amount of increase in the refractive index of the first core portion 12 is on the order of $6 \times 10^{-3}$ for each of the ordinary ray and the extraordinary ray.

FIG. 2b is a sectional view schematically showing the resulting condition after the proton exchange treatment has been performed on both sides of the first core portion 12 of the substrate 11 shown in FIG. 2a. The proton exchange treatment (a source of proton exchange: benzoic acid) is performed on regions 3a and 3b on both sides of the first core portion 12. Only the refractive index for the extraordinary ray is increased in the proton exchanged regions 3a and 3b and in the present embodiment the amount of increase is on the order of $1.3 \times 10^{-1}$.

FIG. 2c is a sectional view schematically showing the condition obtained after performing the heating annealing treatment in the condition of FIG. 2b. As a result of this annealing treatment, the proton-exchanged regions 3a and 3b are extended in the width direction and the depth direction (the second core portion 13a and 13b) and the refractive indices are varied. In this case, the conditions of the annealing treatment are set in such a manner that the amounts of change in the refractive indices of the first core portion 12 and the second core portion 13a and 13b become substantially the same.

Next, the refraction distribution of the optical waveguide device of FIG. 1 produced in the above-mentioned manner will be explained.

Figure 3:
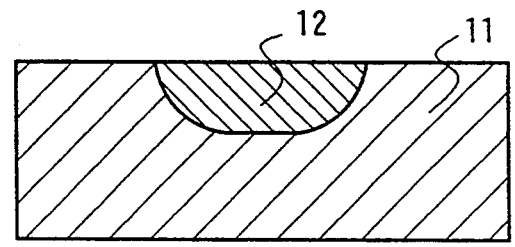
FIG. 3 is a longitudinal sectional view showing schematically the portion having an increased refractive index for the ordinary ray in the optical waveguide device of FIG. 1.

Firstly, FIG. 3 selectively shows the region of the increased refractive index for the ordinary ray, i.e., the first core portion 12, and the waveguide formed by the first core portion 12 with the substrate 11 serving as the cladding forms a single-moded waveguide for the ordinary ray which propagates through it.

Figure 4:
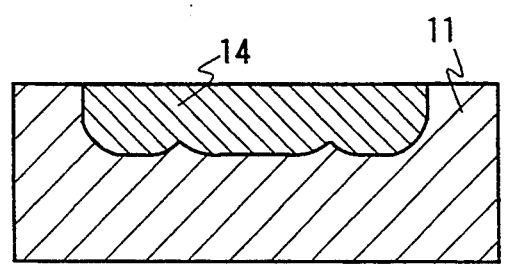
FIG. 4 is a longitudinal sectional view showing schematically the portion having an increased refractive index for the extraordinary ray in the optical waveguide device of FIG. 1.

On the other hand, FIG. 4 schematically shows a region 14 of the increased refractive index for the extraordinary ray (i.e., the region combining the first core portion 12 and the second core portions 13a and 13b) and the waveguide formed by the region 14 constitutes a double-moded waveguide for the extraordinary ray which propagates through it.

Figure 5:
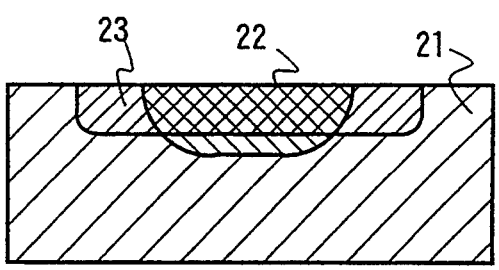
FIG. 5 is a longitudinal sectional view showing schematically the construction of a principal part of an optical waveguide device according to a second embodiment of the present invention.

An optical waveguide device according to a second embodiment of the present invention, which has the sectional construction shown in FIG. 5, is formed by using a lithium niobate single crystal substrate 21 as a cladding. Provided on the surface of the substrate 21 are a first core portion 22 formed by the thermal diffusion of Ti and higher in refractive index than the substrate 21 for both of the ordinary ray and the extraordinary ray and a second core portion 23 formed by a proton exchange treatment and the following heating annealing treatment and higher in refractive index than the substrate 21 only for the extraordinary ray.

In this embodiment, the second core portion is formed in superposition on the first core portion 22 to have a greater width than the first core portion 22. As the result of the adjustment of the refractive index distributions of the respective portions, the first core portion 22 constitutes a single-moded waveguide for the ordinary ray propagating through it and the second core portion 23 including the portion in superposition with the first core portion 22 constitutes a double-moded waveguide for the extraordinary ray propagating through it.

Figure 6A:
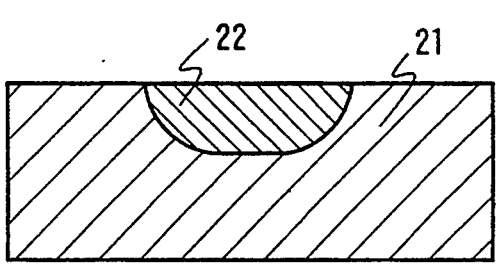
FIGS. 6a, 6b and 6c are schematic sectional views showing in due order the production operations of the optical waveguide device of FIG. 5.
Figure 6B:
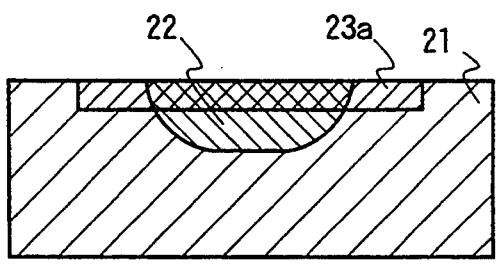
Figure 6C:
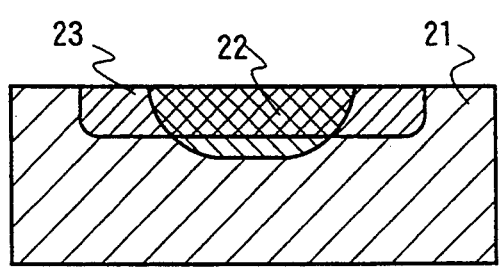

The production of the optical waveguide device of FIG. 5 will now be described with reference to FIGS. 6a, 6b and 6c schematically showing the constructions at the sections crossing the waveguide at right angles.

Firstly, FIG. 6a is a sectional view schematically showing the resulting condition after the diffusion of Ti into the limited region in the surface of the lithium niobate single crystal substrate 21. The first core portion 22 is formed by applying a film of Ti of a waveguide pattern on the substrate 21 and then heating the Ti film to diffuse it into a limited region of the substrate 21. The first core portion 22 is higher in refractive index than the substrate 21 with respect to both the ordinary ray and the extraordinary ray and thus the first core portion 22 is constructed to form a single-moded waveguide for both the guided light of the ordinary ray and the guided light of the extraordinary ray. In the case of this embodiment, the amount of increase in the refractive index is on the order of $6 \times 10^{-3}$ for both the ordinary ray and the extraordinary ray.

FIG. 6b is a sectional view schematically showing the resulting condition after the proton exchange treatment was performed on the limited region of the substrate surface so as to be superposed on the first core portion 22 of the substrate 21 shown in FIG. 6a. The proton exchanged region 23a (a source of proton exchange: benzoic acid) is formed so that it is superposed on the surface of the first core portion 22 and greater in width than the first core portion 22. In the proton exchanged region 23a, only the refractive index for the extraordinary ray is increased and in this embodiment the amount of increase is on the order of $1.3 \times 10^{-1}$.

FIG. 6c is a sectional view schematically showing the resulting condition after the annealing treatment was effected in the condition of FIG. 6b. As the result of the annealing treatment, the proton exchanged region 23a is extended in the width direction and the depth direction thus forming the second core portion 23 and the refractive index of the second core portion 23 is changed. At this time, the conditions of the annealing are selected in such a manner that the amount of change in the refractive index of the second core portion 23 becomes substantially equal to the amount of change in the refractive index of the first core portion 22.

In the optical waveguide device of FIG. 5 produced in the above-mentioned manner, the first core portion 22 constitutes a single-moded waveguide for the ordinary ray and the second core portion 23 including the portion in superposition with the first core portion constitutes a double-moded waveguide for the extraordinary ray.

In other words, as in the case of the first embodiment, the optical waveguide device of the present embodiment selectively functions as a single-moded waveguide and a double-moded waveguide depending on the direction of polarization of light.

It is to be noted that while, in the above-mentioned embodiments, the lithium niobate single crystal is used for the substrate forming the cladding, the present invention is of course not limited thereto and therefore a single crystal material having an electro-optic effect, e.g., lithium tantalate ($LiTaO_3$) may also be used.

Further, while, in these embodiments, Ti is used as the diffusion source in the formation of the first core portion by the thermal diffusion process, where the lithium niobate substrate is used, a transition metal such as vanadium (V), nickel (Ni) or copper (Cu) may be used as a diffusion source in place of Ti, and a transition metal such as Cu, Ti or niobium (Nb) may be used in the case where the lithium tantalate substrate is used.

Also, while, in these embodiments, benzoic acid is used as the source of proton exchange for the second core portion formed by the proton exchange process, pyrophosphoric acid, silver mitrate, etc., may also be used.

Further, while, in these embodiments, the proton exchange process is used as the method of increasing the refractive index only for the extraordinary ray, the $Li_2O$ outdiffusion process can be used in place of the former method.

Figure 7:
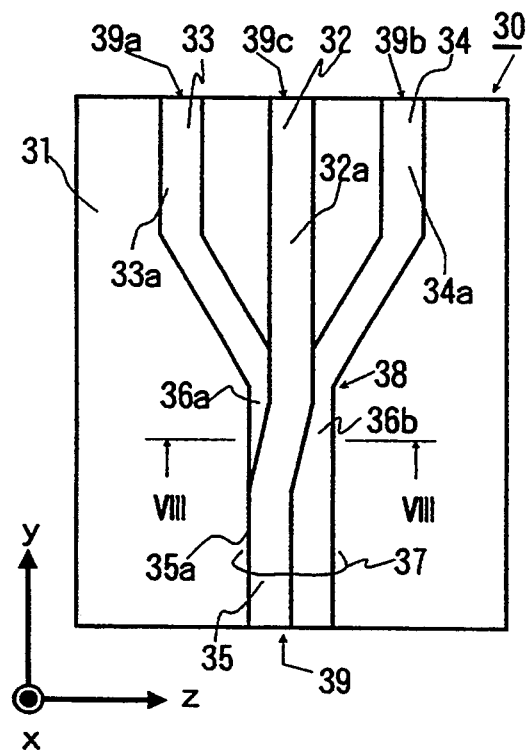
FIG. 7 is a plan view showing schematically the construction of a principal part of an optical waveguide device according to a third embodiment of the present invention.
Figure 8:
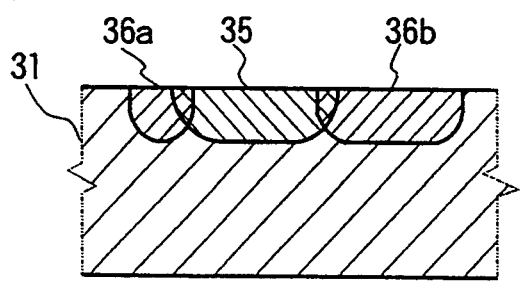
FIG. 8 is a longitudinal sectional veiw showing schematically the construction of the principal part along the line VIII—VIII of FIG. 7.

FIGS. 7 and 8 show an optical waveguide device 30 according to a third embodiment of the present invention. In the Figures, shown on one surface side of a lithium niobate single crystal substrate 31 are a region 32a for constituting a single-moded waveguide 32, a region 33a for constituting a single-moded waveguide 33, a region 34a for constituting a single-moded waveguide 34, a region 35a for constituting a single-moded waveguide 35, and regions 36a and 36b for constituting, along with the region 35, a double-moded waveguide 37.

When producing the waveguide device 30, Ti is first diffused into the surface of the substrate 31 by the thermal diffusion process such as mentioned previously to form a first core portion in the regions 35a and 32a. Series-connected single-moded waveguides 32 and 35 are provided by the first core portion formed in the regions 32a and 35a. In other words, the single-moded waveguide 35 is smoothly deflected from the single-moded waveguide 32 toward the region 33a (or the region 34a) side and therefore the two waveguides are substantially formed as a straight waveguide.

A second core portion is formed in the regions 33a and 34a and the regions 36a and 36b on both sides of the single-moded waveguide 35 by the proton exchange process and the following annealing treatment. The construction at the cross-section shown by the arrowed line VIII—VIII of FIG. 7 is schematically shown in FIG. 8. The distributing single-moded waveguides 33 and 34 are constituted by the second core portion of the regions 33a and 34a, respectively. Also, a double-moded waveguide 37 is constituted by the first core portion of the region 35a and the second core portion of the regions 36a and 36b. It is to be noted that while, in FIG. 8, the superposition of the Ti diffused region and the proton exchanged regions is shown, the indication of this superposition is ommitted in FIG. 7.

As shown in FIG. 7, the end face of the double-moded waveguide 37 constitutes a first optical port 39 and in this optical port the center of the single-moded waveguide 35 and the center of the bouble-moded waveguide 37 are arranged at positions which are displaced from each other. A second optical port 39a and a third optical port 39b are respectively formed by the end faces of the two single-moded waveguides 33 and 34 which are branched from the double-moded waveguide 37 by a branching portion 38. Also a fourth optical port 39c is formed by the end face of the single-moded waveguide 32 smoothly connected to the single-moded waveguide 35.

Figure 9:
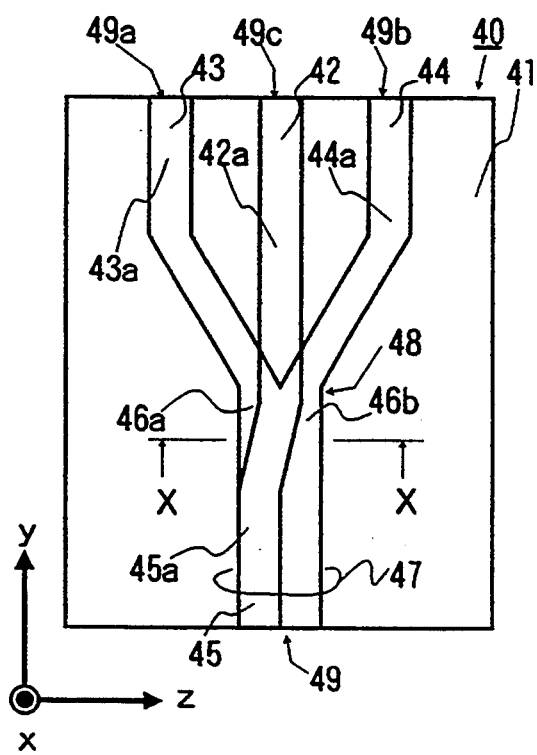
FIG. 9 is a plan view showing schematically the construction of a principal part of an optical waveguide device according to a modification of the embodiment in FIG. 7.
Figure 10:
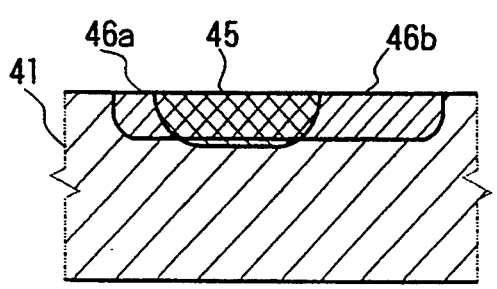
FIG. 10 is a longitudinal sectional view showing schematically the construction of the principal part along the line X—X of FIG. 8.

FIGS. 9 and 10 show an optical waveguide device 40 according to a modification of the third embodiment. In the Figures, shown on one surface of a substrate 41 made of a lithium niobate single crystal are a region 42a for constituting a single-moded waveguide 42, a region 43a for constituting a single-moded waveguide 43, a region 44a for constituting a single-moded waveguide 44, a region 45a for constituting a single-moded waveguide 45 and regions 46a and 46b for constituting, along with the region 45a, a double-moded waveguide 47.

When producing this waveguide device 40, Ti is diffused into the surface of the substrate 41 by such a thermal diffusion process as mentioned previously and a first core portion is formed in each of the regions 45a and 42a. The single-moded waveguides 42 and 45, which are connected in series, are respectively constituted by the first core portion of the regions 42a and 45a. In other words, the single-moded waveguide 45 is smoothly deflected from the single-moded waveguide 42 toward the side of the region 43a (or the region 44a) so that the two waveguides are formed as a substantially straight waveguide.

A second core portion is formed in each of the regions 43a, 44a, 45a, 46a and 46b by the proton exchange treatment and the following annealing treatment. The cross-sectional construction as looked in the direction of arrows X—X of FIG. 9 is shown schematically in FIG. 10. The distributing single-moded waveguides 43 and 44 are respectively constituted by the second core portion of the regions 43a and 44a. Also, the double-moded waveguide 47 is constituted by the combined region of the first and second core portions of the regions 45a, 46a and 46b.

As shown in FIG. 9, the end face of the double-moded waveguide 47 constitutes a first optical port 49 and in this optical port the center of the single-moded waveguide 45 and the center of the double-moded waveguide 47 are arranged in positions which are displaced from each other. A second optical port 49a and a third optical port 49b are respectively constituted by the end faces of the single-moded waveguides 43 and 44 which are bifurcated by a branching portion 48 from the double-moded waveguide 47. Also, a fourth optical port 49c is constituted by the end face of the single-moded waveguide 42 which is smoothly connected to the single-moded waveguide 45.

Where Ti is thermally diffused into the limited regions on the surface of the substrate 41, the refractive index for the ordinary ray and the refractive index for the extraordinary ray in these regions are both increased, whereas in the case of the proton exchange treatment, only the refractive index for the extraordinary ray is selectively increased and the refractive index for the ordinary ray is not varied much. Therefore, as mentioned previously, with the optical waveguide produced by the technique of the third embodiment or its modification, by suitably selecting the processing conditions of the proton exchange treatment and the following annealing treatment, the waveguide 35 or 45 which is adapted to function as the single-moded waveguide for the ordinary ray and the waveguide 37 or 47 adapted to function as the double-moded waveguide for the extraordinary ray are included in the common optical port 39 or 49.

Figures 11, 12:
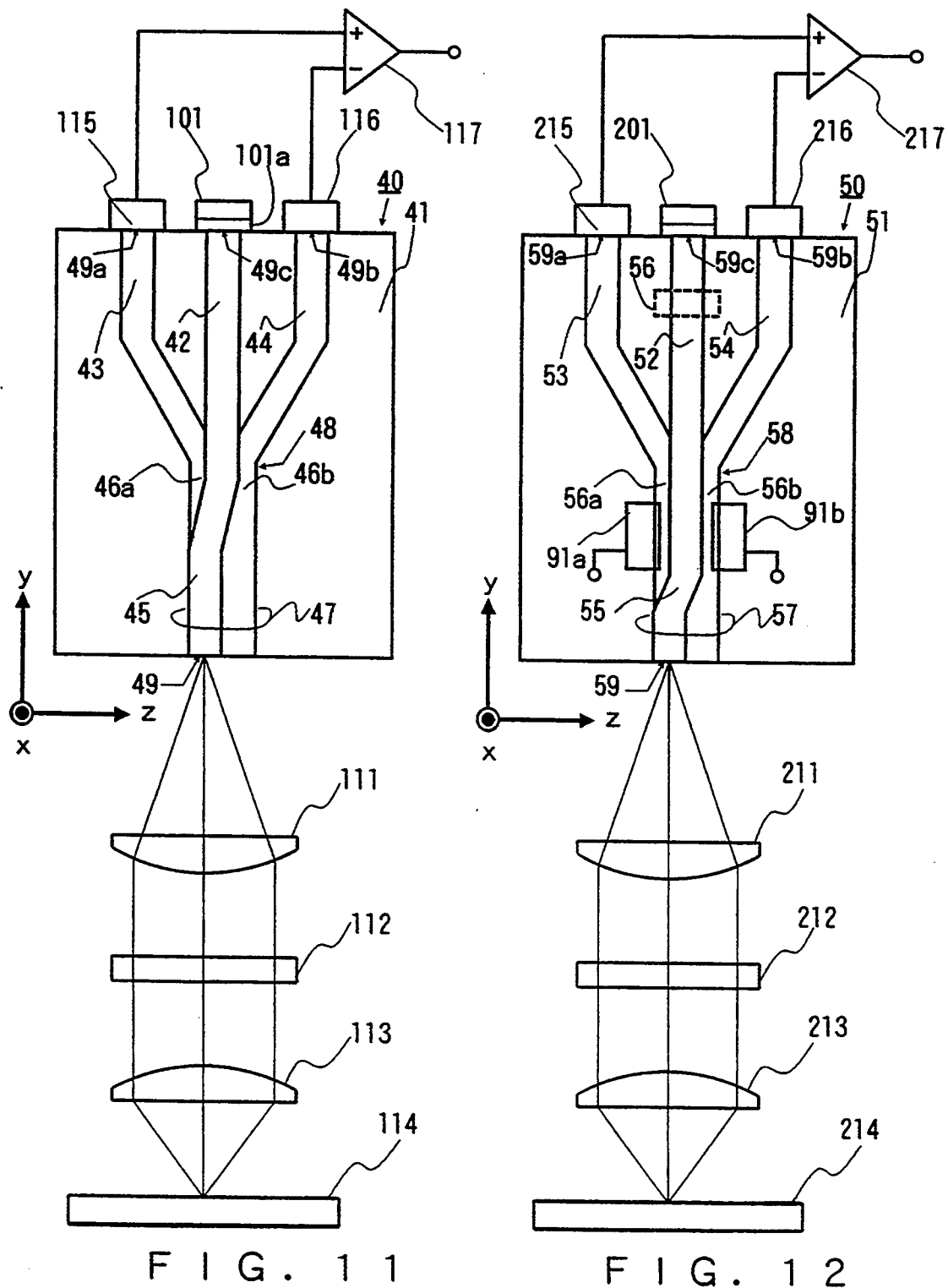
FIG. 11 is a block diagram showing an optical focal point detecting apparatus according to a fourth embodiment of the present invention.
FIG. 12 is a block diagram showing a modified form of the focal point detecting apparatus of FIG. 11.

Referring to FIG. 11, there is schematically shown the construction of an optical instrument according to a fourth embodiment of the present invention. This optical instrument is constructed as a focal point detecting apparatus useful for example for the detection of a focusing error signal in an optical disc apparatus. This focal point detecting apparatus employs the optical waveguide device 40 according to the third embodiment, and in FIG. 11 the individual components of the optical waveguide device 40 are designated by the same reference numerals as in FIG. 9 thereby omitting any detailed explanation thereof in the description to follow. It is to be noted that the substrate 41 used in this optical waveguide device 40 is composed of an $LiNbO_3$ single crystal substrate of the X-cut, Y-propagation type in the X-Y coordinate representation shown in FIG. 9.

This focal point detecting apparatus detects and observes the deviation of the focal position of a laser spot in accordance with the inclination distribution of an object surface to be detected. For this purpose, the length L of the double-moded waveguide 47 is preliminarily designed so as to represent such effective length of the double-moded region which permits measurement of the asymmetry of the phase distribution. This length L can be obtained from the previously mentioned equation (1) or (3).

A laser light source 101 is optically coupled to the optical port 49c of the optical waveguide device 40, and the laser light source 101 is constructed by combining for example a semiconductor laser and a polarizing plate 101a so as to emit a linearly polarized light of a predetermined polarizing direction. In this case, the arranging orientations of the laser light source 101 and the substrate 41 are determined such that the linearly polarized light from the laser light source 101 propagates as an ordinary ray through the waveguide 42 and the light of a polarizing direction perpendicular to the former propagates as an extraordinary ray through the waveguide 42.

The laser beam from the light source 101 is propagated through the single-moded waveguides 42 and 45 and emitted from the optical port 49. This emitted laser beam is converted to an illuminating light or a collimated light beam collimated by a collimator lens 111 and it is then passed through a quarter-wave plate 112 serving as polarizing means. The illuminating light passed through the quarter-wave plate 112 is condensed on the surface of an optical disc 114 or an object surface to be detected.

The reflected light produced from the laser spot condensed region on the object surface is passed in the reverse direction through an objective lens 113 and the quarter wave plate 112 so that it is converted to a linearly polarized light of a polarizing direction perpendicular to the polarizing direction of the illuminating light. This linearly polarized light of the reflected light is condensed on the optical port 49 by the collimator lens 111.

The reflected light from the surface of the optical disc 114 is in the form of an extraordinary ray for the substrate 41 at the time of its incidence to the optical port 49 in the above-mentioned manner. Thus, this reflected light is propagated through the double-moded waveguide 47 from the optical port 49 and it is then distributed into the single-moded waveguides 43 and 44 from the branching portion 48. Light detectors 115 and 116 are respectively coupled optically to the optical ports 49a and 49b respectively formed at the end faces of the single-moded waveguides 43 and 44 and the outputs of these light detectors are applied to a differential amplifier 117 thereby detecting a deviation between the two outputs.

In accordance with the present embodiment the incident position of the reflected light at the optical port 49 is set to a position which is displaced from the center of the double-moded waveguide 47 so that if the effective length of the double-moded waveguide 47 is selected optimally as mentioned previously, the deviation from in-focus of the laser beam spot on the surface of the optical disc 114 or the object surface to be detected can be detected from the deviation in light amount between the emitted beams from the two optical ports 49a and 49b or the output of the differential amplifier 117. It is to be noted that the illustration of the playback system for the information recorded on the optical disc 114 and the optical system for automatic tracking purposes is omitted.

FIG. 12 shows a focal point detecting apparatus according to a modification of the fourth embodiment and in this apparatus the fact that an X cut, Y propagation-type lithium niobate substrate 51 has an electro-optic effect is utilized in such a manner that by applying a controlled electric field to a double-moded waveguide 57 of an optical waveguide device 50, it is possible to variable control the complete coupling length of the double-moded region to the optimum value for measurement.

In FIG. 12, the optical waveguide device 50 includes, on the surface of the substrate 51 made of the X cut, Y propagation-type lithium niobate single crystal, a single-moded waveguide 52, a single-moded waveguide 53, a single-moded waveguide 54, a single-moded waveguide 55 and a double-moded waveguide 57.

The end face of the double-moded waveguide 57 constitutes an optical port 59 and in this port the center of the single-moded waveguide 55 and the center of the double-moded waveguide 57 are at positions which are displaced from each other. A second optical port 59a and a third optical port 59b are respectively constituted by the end faces of the single-moded waveguides 53 and 54 which are bifurcated from the double-moded waveguide 57 by a branching portion 58. Also, a fourth optical port 59c is constituted by the end face of the single-moded waveguide 52 which is smoothly connected to the single-moded waveguide 55.

When an electric field is applied in the width direction (the Z-axis direction) of the double-moded waveguide 57, the substrate 51 changes its refractive index efficiently. Therefore, a pair of electrodes 91a and 91b are arranged on the substrate 51 in such a manner that an electric field is applied in the width direction of the double-moded waveguide 57. It is to be noted that where the substrate 51 is made of a single crystal of the Z cut, X or Y propagation type, it is only necessary to arrange the electrodes such that an electric field is applied in the X-axis direction. A regulated voltage is applied across the electrodes 91a and 91b from an external control power source which is not shown so that an Z-axis direction electric field of the desired value is applied to the double-moded waveguide 57.

When applying the electric field to the double-moded waveguide 57, it is desirable to attempt as far as possible so that the voltage is applied at such location where the refractive index distribution within the waveguide is symmetric. Thus, in the modification shown in FIG. 12, the double-moded waveguide 57 includes, on the side near to the branching portion 58, the symmetrically arranged portion in center-to-center alignment with the single-moded region 55, and the electrodes 91a and 91b are arranged on the sides of the symmetrically arranged portion.

In FIG. 12, a laser light source 201 is optically coupled to an optical port 59c of the optical waveguide device 50 and the laser light source 201 produces an illuminating light of a linearly polarized light having a predetermined polarizing direction. The arranging orientations of the laser light source 201 and the substrate 51 are determined in such a manner that when the illuminating light from the laser light source 201 propagates through the waveguide 57, the illuminating light from the laser light source becomes an ordinary ray and the light of a polarizing direction perpendicular to the illuminating light becomes an extraordinary ray.

The laser beam from the light source 201 is propagated through the single-moded waveguides 52 and 55 and emitted from the optical port 59. This emitted laser beam is converted to a collimated light beam collimated by a collimator lens 211 and it is then passed through a quarter-wave plate 212 serving as polarizing means. The illuminating light passed through the quarter-wave plate 212 is condensed through an objective lens 213 on the surface of an optical disc 214 or an object surface to be detected.

The reflected light produced from the laser beam condensed region on the object surface is passed in the reverse direction through the objective lens 213 and the quarter-wave plate 212 so that the reflected light is converted by the quarter-wave plate 212 to a linearly polarized light of a polarizing direction perpendicular to the polarizing direction of the illuminating light. This linearly polarized light of the reflected light is condensed at the optical port 59 by the collimator lens 211.

The reflected light from the surface of the optical disc 214 becomes an extraordinary ray with respect to the substrate 51 at the time of its entrance into the optical port 59 in the above-mentioned manner. This reflected light is propagated from the optical port 59 through the double-moded waveguide 57 and distributed to the single-moded waveguides 53 and 54 from the branching portion 58. Light detectors 215 and 216 are respectively coupled optically to optical ports 59a and 59b formed at the end faces of the single-moded waveguides 53 and 54 so that the outputs of the two light detectors are applied to a differential amplifier 217 and the deviation between the two outputs is detected.

In the present embodiment, an electric field controlled by the voltage applied externally across the electrodes 91a and 91b is applied in the width direction of the double-moded waveguide 57 so that the complete coupling length of the double-moded waveguide 57 is optically adjusted. The deviation from in-focus of the laser beam spot on the surface of the optical disc 214 is detected from the output of the differential amplifier 217 in accordance with the deviation in light amount between the emitted beams from the two optical ports 59a and 59b.

It is to be noted that while FIGS. 11 and 12 show the cases in which the optical disc 114 or 214 constitutes an object surface to be detected, it is needless to say that the basic construction of the focal point detecting apparatus shown in these Figures can be generally applied to the ordinary optical focal point detecting apparatus adapted for use with not only the optical discs but also a variety of objects to be detected.

Also, in FIG. 12 a backward light preventive element 56 shown by a dotted line in the single-moded waveguide 52, is an optical element for preventing the incidence of the backward light to the light source 201 and it is provided as occasion demands. The reason is that where the laser light source 201 is composed of a semiconductor laser, for example, the incidence of the backward light to the semiconductor laser gives rise to an inconvenience of making its operation unstable and therefore the element 56 is provided for the purpose of eliminating this inconvenience.

On the other hand, if the polarizing direction of the illuminating light from the semiconductor laser is deviated from the proper direction with respect to the substrate 51, the irradiation of the illuminating light causes an ordinary ray and an extraordinary ray to propagate through the waveguide 52 and the propagating state of the object surface illuminating light through the waveguide 52 deviates substantially from the single mode. The backward light preventive element 56 is also effective in overcoming such inconveniences.

Where the substrate 51 is composed of a single crystal of the X cut, Y propagation type, a known type of mode splitter for separating the ordinary ray of the TE mode and the extraordinary ray of the TM mode depending on the polarizing direction of the propagating light may be used as0 the backward light preventive element 56. On the other hand, where the substrate 51 is composed of a single crystal of the Z cut, X or Y propagation type, a metal-clad polarizer which absorbs the light of the TM mode propagating through the single mode waveguide 52 and passes only the light of the TE mode may be used.

Figure 13:
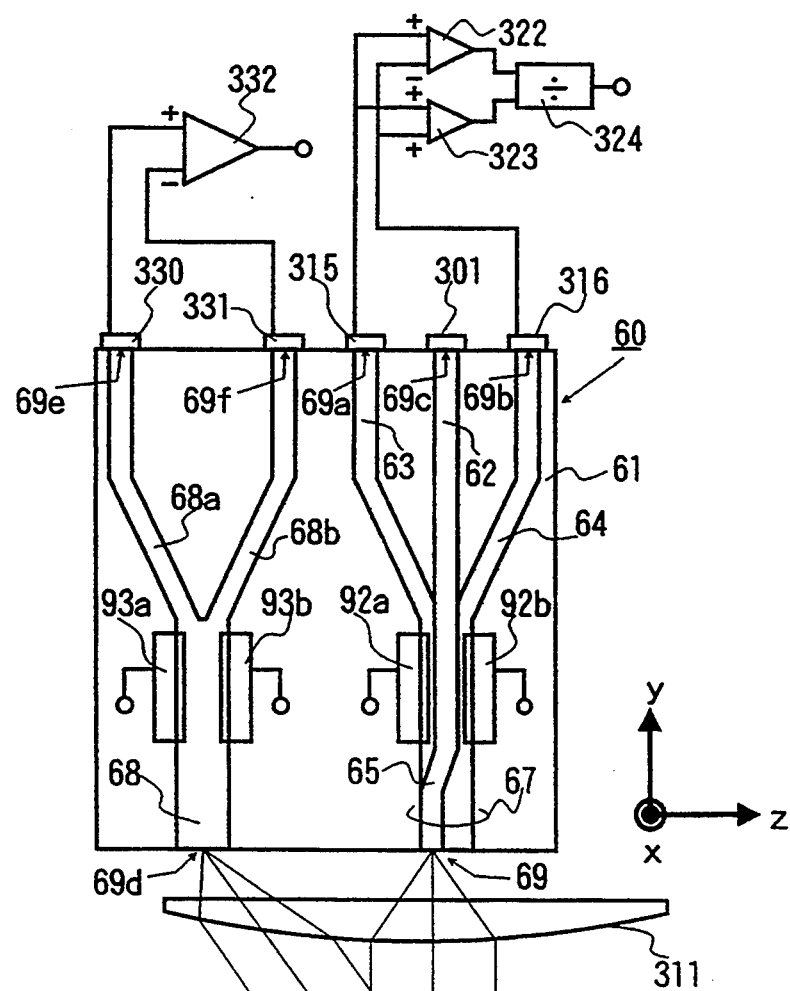
FIG. 13 is a block diagram showing a schematic construction of an optical unevenness measuring apparatus according to a fifth embodiment of the present invention, which is incorporated in a laser scanning microscope.

FIG. 13 shows an optical instrument according to a fifth embodiment of the present invention and this optical instrument constitutes a laser scanning microscope system having a function of measuring the unevenness of an object surface to be detected. An optical waveguide device 60 used in this system includes first and second optical waveguide systems which are built in the common lithium niobate single crystal substrate 61.

The first optical waveguide system has the same construction as the optical waveguide device 50 in the fourth embodiment and it includes a series of single-moded waveguides 62 and 65 for propagating an illuminating light, a double-moded waveguide 67 for propagating the reflected light from an object surface to be detected, two single-moded waveguides 63 and 64 bifurcated from the double-moded waveguide 67 and a pair of electrodes 92a and 92b for variably adjusting the complete coupling length of the double-moded waveguide 67 by the application of an electric field.

The second optical waveguide system includes a double-moded waveguide 68 for propagating the reflected light from the object surface, two single-moded waveguides 68a and 68b bifurcated from the double-moded waveguide 68 and a pair of electrodes 93a and 93b for variably adjusting the complete coupling length of the double-moded waveguide 68 by the application of an electric field.

The illuminating light (linearly polarized light) emitted from a semiconductor laser light source 301 is entered into the single-moded waveguide 62, propagated through the series of the single-moded waveguides 62 and 65 and emitted from an optical port 69. This illuminating light is collimated by a collimator lens 311 so that the resulting collimated light beam is then passed through a polarization selective diffraction grating 320, a quarter-wave plate 312 and a scanner 321 in this order and condensed on an object surface 339 to be detected through an objective lens 313.

The polarization selective diffraction grating 320 is responsive to the polarizing direction of the illuminating light to transmit the illuminating light directed toward the object surface 339 from the collimator lens 311 and it diffracts the reflected light directed toward the collimator lens 311 from the object surface 339 side in accordance with its direction of polarization.

The scanner 321 moves the light spot condensed on the object surface 339 relative to it within the X-Z coordinate plane in the rectangular coordinate representation of the Figure.

The reflected light from the object surface 339 is formed into a collimated light beam by the objective lens 313 and it is then converted by the quarter-wave plate 312 to a linearly polarized light of a polarizing direction which is perpendicular to the polarizing direction of the illuminating light. The reflected light converted to the linearly polarized light by the quarter-wave plate 312 is diffracted when it is passed through the polarization selective diffraction grating 320.

Depending on the optical characteristics and arranging orientation of the diffraction grating 320, of the diffracted light produced from the diffraction grating 320 the 0-order diffracted light is condensed on one optical port 69 through the collimator lens 311 for unevenness measuring purposes and the first-order diffracted light is condensed on the other optical port 69d for the measurement and observation of the phase distribution and the light intensity distribution of the object surface 339 through the collimator lens 311. In this way, the 0-order diffracted light of the reflected light is introduced into the double-moded waveguide 67 of the first optical waveguide system from the optical port 69 and the first-order diffracted light of the reflected light is introduced into the double-moded waveguide 68 of the second optical waveguide system from the optical port 69d.

In the first optical waveguide system, as in the case of the fourth embodiment, the light amounts of the 0-order diffracted light introduced into the double-moded waveguide 67 from the optical port 69 are detected by detectors 315 and 316 respectively photo coupled to optical ports 69a and 69b at the end faces of the single-moded waveguides 63 and 64. The detection signals from the detectors 315 and 316 are applied to a deviation calculating circuit 322 for producing an output corresponding to the difference($\Delta$ I) between the two signals and to a sum calculating circuit 323 for producing an output corresponding to the sum (S) of the two signals. The output signals from the deviation calculating circuit 322 and the sum calculating circuit 323 are applied to a divider 324 which in turn produces an output signal corresponding to the quotient($\Delta$ I/S) of the two signals or a detection output corresponding to the amount of deviation from in-focus of the light spot on the object surface 339.

Where the reflectance distribution of the object surface 339 is not constant, a variation corresponding to the reflectance distribution is caused in the total light amount of the reflected light introduced into the waveguide 67 from the optical port 69 by the scanning. The sum calculating circuit 323 and the divider 324 are provided to compensate for this variation in the total light amount. The detection output (Δ I/S) from the divider 324 is a signal compensated so as to include no variation in the total light amount of the reflected light due to the reflectance distribution of the object surface. While there are case where such compensation is not required, in such cases it is only necessary to use the output of the deviation calculating circuit 322 as the detection signal.

On the other hand, in the second optical waveguide system the first-order diffracted light introduced into the double-moded waveguide 68 from the optical port 69d is propagated through the double-moded waveguide 68 and distributed into two single-moded waveguides 68a and 68b through its branching portion whereby asymmetry in the light intensity of the first-order diffracted light is detected by detector 330 and 331 which are respectively photo coupled to optical ports 69e and 69f at the end faces of the waveguides 68a and 68b. The detection signals of the detectors 330 and 331 are applied to a deviation calculating circuit 332 which in turn produces an output corresponding to the difference between the two signals. In this case, the optical port 69d of the double-moded waveguide 68 receives the first-order diffracted light at substantially the center thereof to substantially perform the same function as a pinhole and therefore the optical system including the second optical waveguide system constitutes a confocal-type laser scanning microscope. The phase distribution (inclination or unevenness) or the light intensity distribution (reflectance) of the object surface 339 can be measured from the detection signal of the deviation calculating circuit 332.

When measuring the phase distribution of the object surface 339, the effective length of the double-moded waveguide 68 is selected to be a length determined by the previously mentioned equation (1) or (3), whereas when measuring the intensity distribution of the object surface 339, the effective length of the double-moded waveguide 68 is selected to be a length determined by the previously mentioned equation (2) or (4). Since the complete coupling length of the double-moded waveguide 68 can be adjusted by applying the desired voltage across the electrodes 93a and 93b, even if the double-moded waveguide 68 having an inherent fabricated length is used, the voltage applied across the electrodes 93a and 93b can be varied to selectively effect the switching between the measurement of phase distribution and the measurement of intensity distribution.

Figure 15:
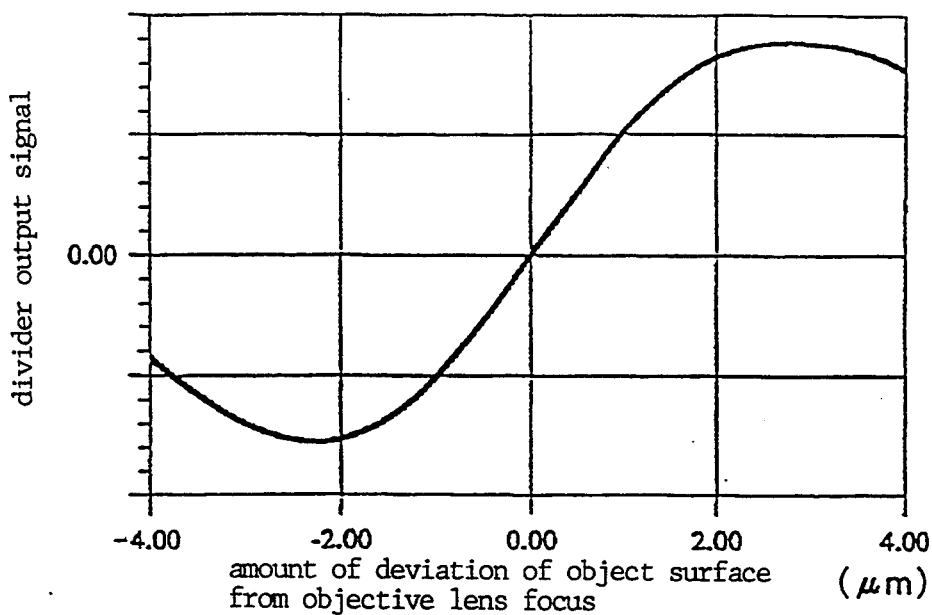
FIG. 15 is a graph showing an example of a divider output-deviation from in-focus conversion function used in the unevenness measurement by the unevenness measuring apparatus of FIG. 13.

In the unevenness measurement of the object surface 339 effected by the measuring system formed by the first optical waveguide system, the detection signal read from the divider 324 can be calculated for example in terms of the amount of deviation from in-focus by use of the conversion table shown in FIG. 15 by way of example. The functional data shown in FIG. 15 can be preliminarily measured and obtained as the relation between the magnitude of the detection output of the divider 324 and the deviation between the focal position of the objective lens 313 of the laser scanning microscope system and the object surface (the deviation from in-focus) by using for example a standard specimen having a known size and a plurality of irregularities or the like.

Alternatively, it is possible to directly measure the irregularities in the object surface 339 by placing the object to be detected on a stage 340, moving the stage 340 minutely in the direction of the optical axis by a drive unit 342 such as a piezo actuator so as to reduce the output of the divider 324 to zero (i.e., to attain the in-focus condition), and measuring the resulting amount of stage movement by a laser interferometer 344. In this case, it is not necessary to preliminarily measure such relation as shown in FIG. 15.

Figure 14:
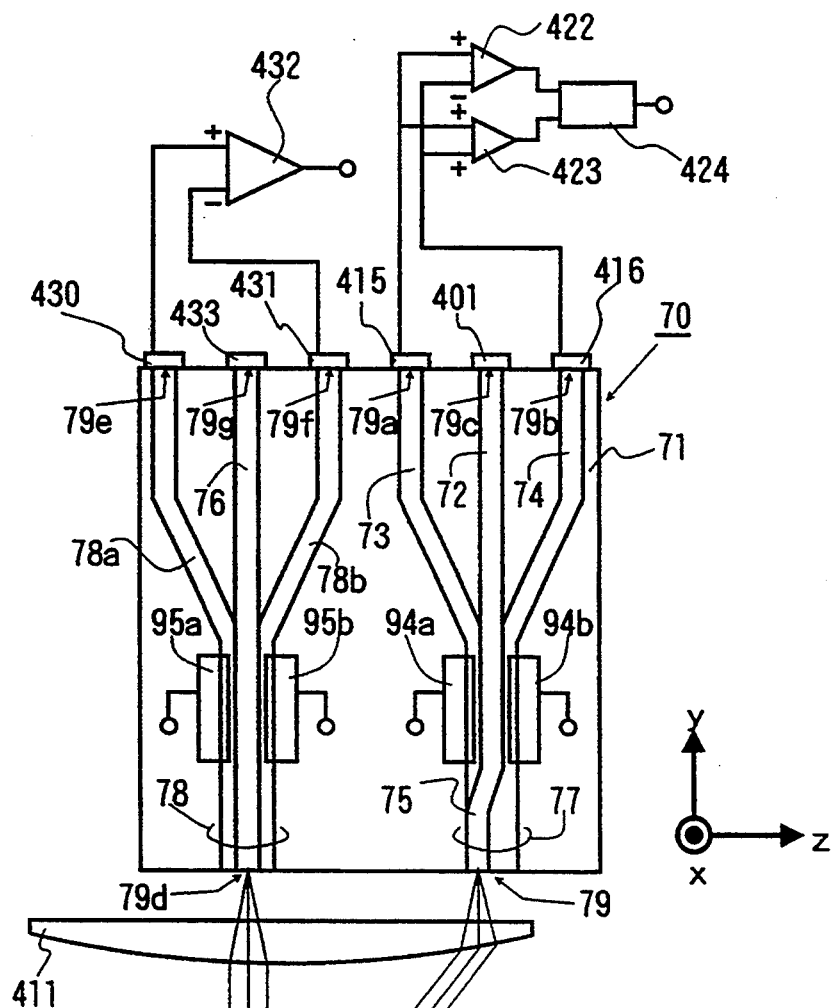
FIG. 14 is a block diagram showing a modified form of the unevenness measuring apparatus of FIG. 13.
Figure 14:
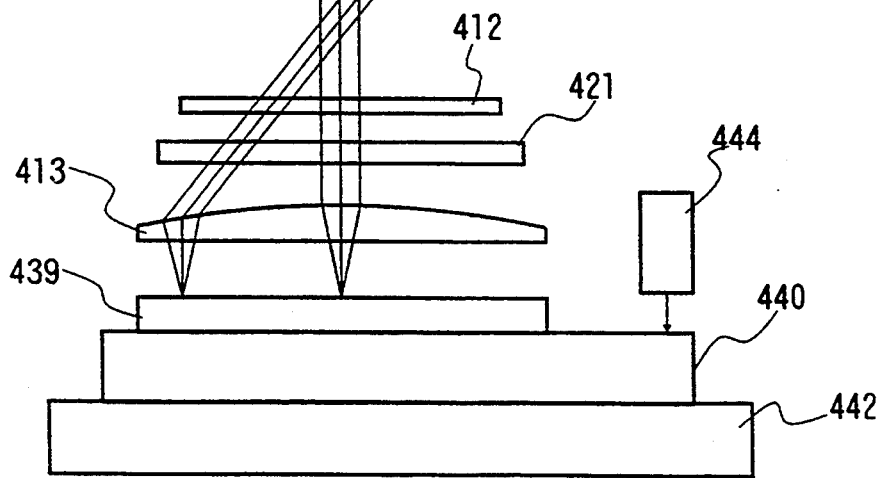

While, in the embodiment shown in FIG. 13, the single semiconductor laser light source 301 is used for the unevenness measurement and the phase distribution or intensity distribution measurement of the object surface 339, in the modification shown in FIG. 14, separate semiconductor laser light sources are used for the respective measurements.

More specifically, FIG. 14 shows an optical instrument according to the modification of the fifth embodiment and this optical instrument also constitutes a laser scanning microscope system having a function of measuring the unevenness of an object surface to be detected. An optical waveguide device 70 used in this system includes first and second optical waveguide systems which are built into the common lithium niobate single crystal substrate 71.

The first optical waveguide system is of the same construction as the optical waveguide device 50 in the fourth embodiment and it includes a series of single-moded waveguides 72 and 75 for propagating the illuminating light (linearly polarized light) from a semiconductor laser light source 401, a double-moded waveguide 77 for propagating the reflected light from an object surface to be detected, two single-moded waveguides 73 and 74 which are bifurcated from the double-moded waveguide 77, and a pair of electrodes 94a and 94b for variably adjusting the complete coupling length of the double-moded waveguide 77 by the application of an electric field.

The second optical waveguide system includes a single-moded waveguide 76 for propagating the illuminating light (linearly polarized light) from another semiconductor laser light source 433, a double-moded waveguide 78 for propagating the reflected light from the object surface, two single-moded waveguides 78a and 78b which are bifurcated from the double-moded waveguide 78, and a pair of electrodes 95a and 95b for variably adjusting the complete coupling length of the double-moded waveguide 78 by the application of an electric field. In the second optical waveguide system, however, the center of the single-moded waveguide 76 and the center of the double-moded waveguide 78 are in alignment with each other within an optical port 79d.

In the first optical waveguide system, the first illuminating light emitted from the semiconductor laser light source 401 is introduced into the single-moded waveguide 72 from an optical port 79c, propagated through the series of single-moded waveguides 72 and 75 and emitted from the optical port 79. The first illuminating light is collimated and converted to a collimated light beam by a collimator lens 411 passed through a quarter-wave plate 412 and a scanner 421 in this order and condensed at a first position on the object surface 439 by an objective lens 413.

The first reflected light from the object surface 439 illuminated by the condensed spot of the first illuminating light, is formed into a collimated light beam by the objective lens 413 and it is then converted by the quarter-wave plate 412 to a linearly polarized light of a polarizing direction which is perpendicular to the polarizing direction of the first illuminating light. The first reflected light converted to the linearly polarized light by the quarter-wave plate 412 is condensed on the optical port 79 by the collimator lens 411 for the unevenness measurement of the object surface 439.

On the other hand, in the second optical waveguide system the second illuminating light emitted from the other semiconductor laser light source 433 is introduced into the single-moded waveguide 76 from the optical port 79a, propagated through the single-moded waveguide 76 and emitted from the optical port 79d. This second illuminating light is collimated by the collimator lens 411 so that the resulting collimated light beam is passed through the quarter-wave plate 412 and the scanner 421 in this order and condensed at a second position on the object surface 439 by the objective lens 413.

The second reflected light from the object surface 439 illuminated by the condensed spot of the second illuminating light is formed into a collimated light beam by the objective lens 413 and it is then converted by the quarter-wave plate 412 to a linearly polarized light of a polarizing direction which is perpendicular to the polarizing direction of the second illuminating light. The second reflected light converted to the linearly polarized light by the quarter-wave plate 412, is condensed on the optical port 79d by the collimator lens 411 for the measurement and observation of the phase distribution and light intensity distribution of the object surface 439.

In this way, the first reflected light is introduced into the double-moded waveguide 77 of the first optical waveguide system from the optical port 79, and the second reflecting light is introduced into the double-moded waveguide 78 of the second optical waveguide system from the optical port 79d.

The scanner 421 relatively moves the light spots condensed at the first and second positions on the object surface within the XZ coordinate plane in the rectangular coordinate representation of the Figure with respect to the object surface 439.

In the first optical waveguide system, as in the case of the fourth embodiment, the light amounts of the first reflected light introduced into the double-moded waveguide 77 from the optical port 79 are detected by detectors 415 and 416 which are respectively photo coupled to the optical ports 79a and 79b at the end faces of the single-moded waveguides 73 and 74. The detection signals from the detectors 415 and 416 are applied to a deviation calculating circuit 422 for producing an output corresponding to the difference($\Delta$ I) between the signals and to a sum calculating circuit 423 for producing an output corresponding to the sum (S) of the two signals. The output signals of the deviation calculating circuit 422 and the sum calculating circuit 423 are applied to a divider 424 which in turn produces an output signal corresponding to the quotient($\Delta$ I/S) of the two signals or a detection output corresponding to the amount of deviation from in-focus of the light spot on the object surface 439. The detection ouptut ($\Delta$ I/S) from the divider 424 is a signal compensated so as to not include any variation in the total light amount of the reflected light due to the reflectance distribution of the object surface.

Also, in the unevenness measurement of the object surface 439 effected by this measuring system constituted by the first optical waveguide system, as mentioned previously, the detection signal read from the divider 424 can be calculated in terms of an amount of deviation from in-focus by utilizing such conversion table as shown in FIG. 15 by way of example. Alternately, it is possible to directly measure the unevenness of the object surface 439 by minutely moving a stage 440 carrying the object thereon in the direction of the optical axis by a drive unit 442 so as to reduce the output of the divider 424 to zero and measuring the resulting amount of stage movement by a laser interferometer 444.

On the other hand, in the second optical waveguide system the second reflected light introduced into the double-moded waveguide 78 from the optical port 79d is propagated through the double-moded waveguide 78 and distributed from its branching portion into the two single-moded waveguides 78a and 78b whereby the asymmetry of the light intensities of the second reflected light is detected by detectors 430 and 431 which are respectively photo coupled to optical ports 79e and 79f at the end faces of the single-moded waveguides 78a and 78b. The detection signals of the detectors 430 and 431 are applied to a deviation calculating circuit 432 for producing an output corresponding to the difference between the two signals. In this case, since the optical port 79d of the double-moded waveguide 78 receives the second reflected light at substantially the center thereof thereby performing substantially the same function as a pinhole and therefore the optical system including the second optical waveguide system constitutes a confocal-type laser scanning microscope. The phase distribution (inclination or unevenness) or the light intensity distribution (reflectance) of the object surface 439 is measured in accordance with the detection signal from the deviation calculating circuit 432.

In this case, it is also possible to adjust the complete coupling length of the double-moded waveguide 78 by the application of the desired voltage accross the electrodes 95a and 95b so that even if the double-moded waveguide 78 having a single inherent fabrication length is used, the applied voltage across the electrodes 95a and 95b can be varied to selectively effect a switching between the phase distribution measurement and the intensity distribution measurement.

Figure 16:
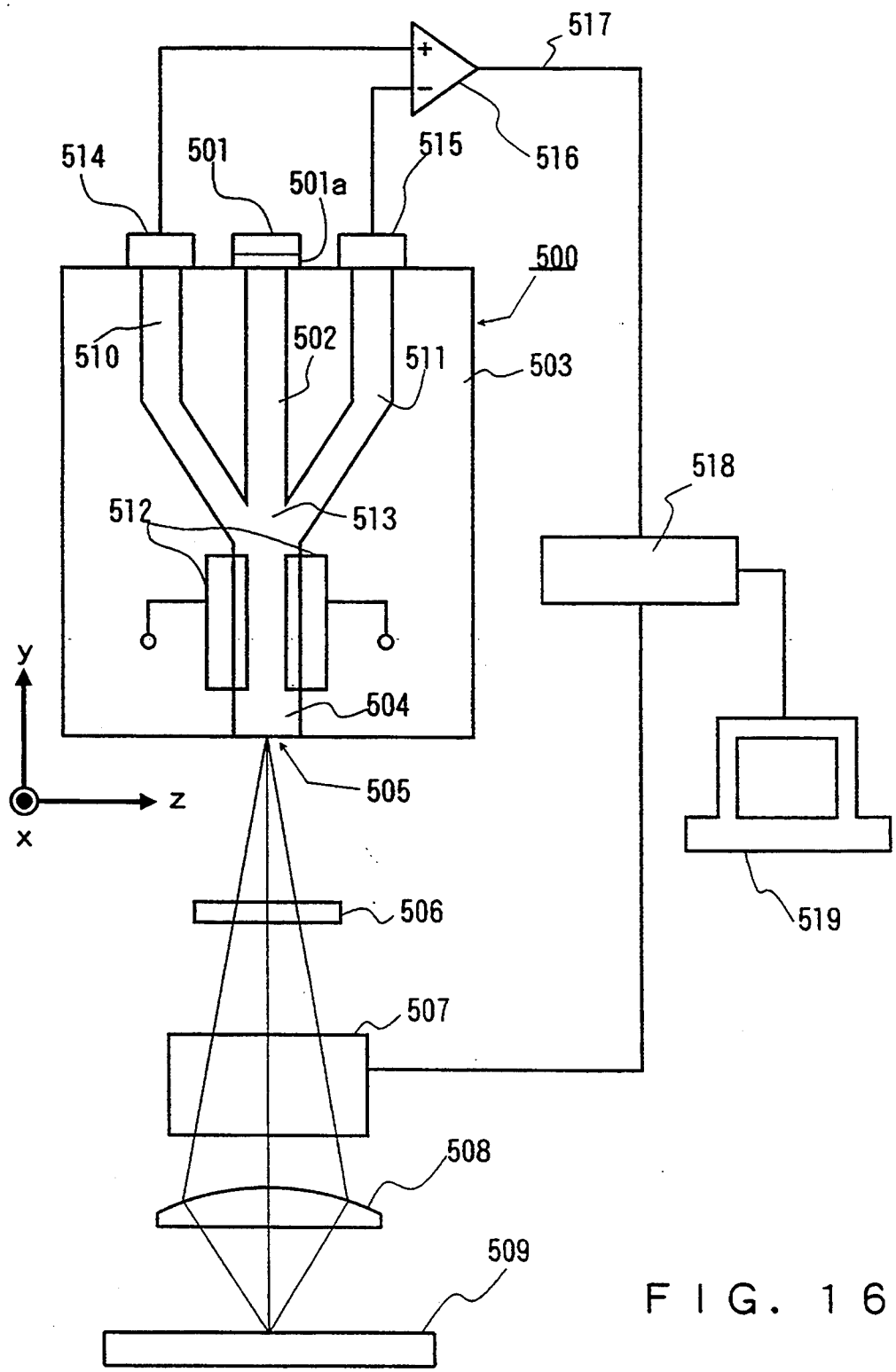
FIG. 16 is a block diagram showing a schematic construction of a confocal laser scanning differential interference microscope according to a sixth embodiment of the present invention.

Refering now to FIG. 16, there is illustrated a confocal laser scanning differential interference microscope according to a sixth embodiment of the present invention. The laser scanning microscope according to this embodiment includes a laser light source 501 for projecting light to an object 509 to be detected, and two light detectors 514 and 515 for detecting the reflected light from the object 509. Also, there is provided an optical waveguide device 500 for propagating the illuminating light from the laser light source 501 and the reflected light from the object 509, respectively.

The optical waveguide device 500 is made of a lithium niobate single crystal substrate 503, and the substrate 503 is formed with a main channel waveguide 504, a branching portion 513 for trifurcating the main channel waveguide 504 and three branch channel waveguides 502, 510 and 511 which are connected to the branching portion 513.

The laser light source 501 includes a polarizing plate 501a to emit a linearly polarized light in the depth direction (a first polarizing direction) of the branch channel waveguide 502, and the polarizing plate 501a need not be provided if the light source 501 is made of a semiconductor laser for producing a linearly polarized light of the first polarizing direction. The laser light source 501 introduces the linearly polarized illuminating light to the end face of the branch channel waveguide 502, and the branch channel waveguide 502 is connected to the main channel waveguide 504 through the branching portion 513. The illuminating light of the linearly polarized light introduced to the end face of the branch channel waveguide 502 is propagated in the single mode through the branch channel waveguide 502 and the main channel waveguide 504 and it is emitted toward the object 509 from an optical port 505 at the end face of the main channel waveguide 504.

Arranged between the optical waveguide device 500 and the object 509 are a quarter-water plate 506, a scanner 507 and an objective lens 508 in this order. The illuminating light of the linearly polarized light emitted from the optical port 505 is converted to a circularly polarized light by the quarter-wave plate 506, then scanned by the scanner 507 relative to the object 509 within the XZ plane in the rectangular coordinate representation in the Figure and condensed on the surface of the object 509 by the objective lens 508. These optical systems concurrently serve a function so that the reflected light produced from the surface of the object 509 illuminated by the condensed spot of the illuminating light or the circularly polarized light is converted to a linearly polarized of a second polarizing direction (the width direction of the waveguide 504) which is perpendicular to the linearly polarized light of the first polarizing direction emitted from the optical port 505, and the reflected light converted to the linearly polarized light of the second polarizing direction is condensed on the optical port 505.

The reflected light introduced into the optical port 505 is propagated in the double mode through the main channel waveguide 504, distributed from the branching portion into the branch channel waveguides 510 and 511 on the sides and propagated through the branch channel waveguides 510 and 511 whereby the intensities of the light propagated through the branch channel waveguides 510 and 511 are respectively detected by light detectors 514 and 515 respectively photo coupled to the end faces of the branch channel waveguides 510 and 511.

Here, the main channel waveguide 504 is formed by the core of anisotropy in refractive index on the lithium niobate single crystal substrate 503 so that it functions as a single-moded waveguide for the linearly polarized light of the first polarizing direction (the depth direction of the waveguide) which is directed toward the optical port 505 from the branching portion 513 and it also functions as a double-moded waveguide for the linearly polarized light of the second polarizing direction (the width direction of the waveguide) which is directed toward the branching portion 513 from the optical port 505.

The outputs of the light detectors 514 and 515 are applied to a differential circuit 516 for obtaining the deviation between the detected light amounts and the detection signal generated from the differential circuit 516 is applied to a controller 518. The controller 518 is also connected to the scanner 507 so that a scanning command is applied to the scanner 507 and also position information of the condensed spot on the object 507 is received from the scanner 507. The controller 518 is responsive to the detection signal from the differential circuit 516 and the position information from the scanner 507 to compose a differential signal image of the surface of the object 509 and display it on a monitor display 519.

Figure 17:
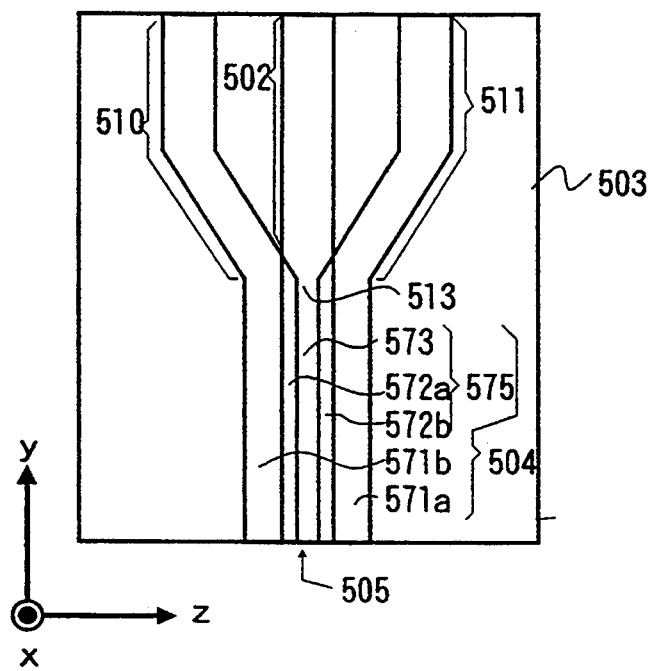
FIG. 17 is a plan view schematically showing an example of the construction of the optical waveguide device used in the microscope according to the embodiment of FIG. 16.

FIG. 17 shows an example of the construction of the optical waveguide device 500 which is well suited for the case where a semiconductor laser is used as the light source 501. In this example, the substrate 503 is made of an X cut, Y propagation-type lithium niobate single crystal, and the core of the main channel waveguide 504 is composed of a Ti-diffused lithium niobate region 573 along the center axis, Ti-diffused and proton exchanged lithium niobate regions 572a and 572b which are on the sides of the region 573, and proton-exchanged lithium niobate regions 571a and 571b which are respectively on the outer sides of the regions 572a and 572b. Also, the core of the central branch channel waveguide 502 is composed of Ti-diffused lithium niobate. Also, the core of the branch channel waveguides 510 and 511, which are on the sides of the waveguides 502, is composed of proton-exchanged lithium niobate.

Figure 21:
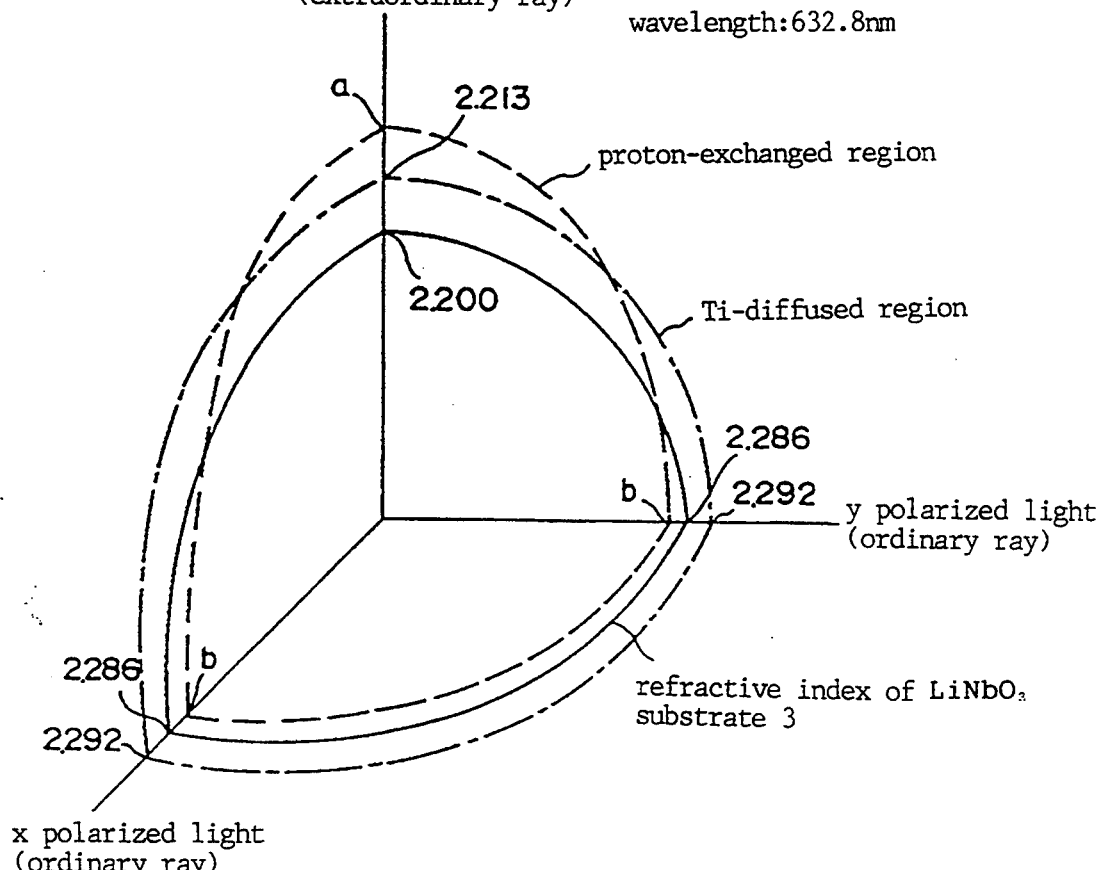
FIG. 21 is a graph showing the respective refractive indices of a lithium niobate single crystal, Ti-diffused lithium niobate single crystal and proton-exchanged lithium niolate single crystal.

The lithium niobate single crystal belongs to the trigonal system and its three crystal optical axes x, y and z are perpendicular to each other with each optical axis showing an anisotropic refractive index for the polarized light in each optical axis direction as shown in FIG. 21. When Ti is diffused into the lithium niobate single crystal, the refractive index is increased in the direction of each of the optical axes x, y and z. Since the substrate 503 of the present embodiment is of the X cut, Y propagation type, the linearly poralized light having the polarizing direction of the waveguide width direction becomes the extraordinary ray and the linearly polarized light having the polarizing direction of the waveguide depth direction becomes the ordinary ray. The amount of increase in the refractive index due to the Ti diffusion is on the order of $6 \times 10^{-3}$ for the ordinary ray and on the order of $1.3 \times 10^{-2}$ for the extraordinary ray. On the other hand, where the lithium niobate single crystal is subjected to proton exchange, in FIG. 21, while a greater increase in the refractive index than in the case of the Ti diffusion is obtained for the polarized light of the z axis direction, conversely the refractive index is slightly decreased for the polarized light of the y-axis direction or the x-axis direction. In other words, the proton exchanged portion increases only the refractive index for the extraordinary ray and its amount of the increase is on the order of $1.3 \times 10^{-1}$. Also, in the case of the proton exchanged lithium single crystal, the refractive index is decreased due to the heat treating operation effected after the proton exchanging operation and therefore any desired refractive index value within the range such as shown in Table 1 can be obtained depending on the conditions of the heat treatment.

TABLE 1

(Refractive indices of different portions)
Wavelength of propagated light: 632.8 nm

| Propagated light Direction of polarization | Illuminating light Waveguide depth direction | Reflected light Waveguide width direction |
|---|---|---|
| Type of polarized light | Ordinary ray (X-polarized) | Extraordinary ray (Y-polarized) |
| LiNbO3 substrate 503 | 2.286 | 2.200 |
| Ti-diffused LiNbO3 core | 2.292 | 2.213 |
| Proton exchanged LiNbO3 core | b = 2.246 ~ 2.286 | a = 2.200 ~ 2.330 |

The branch channel waveguide 502 composed of the Ti-diffused LiNbO3 core is a linear waveguide of the single mode for both the extraordinary ray and the ordinary ray. In the proton-exchanged LiNbO3 regions 571a and 571b of the main channel waveguide 504 only the refractive index for the extraordinary ray (the linearly polarized light of the waveguide width direction)

is increased so that the main channel waveguide 504 not only serves as a double-moded channel waveguide which propagates the extraordinary ray through the region 571a, 571b, 572a, 572b and 573 but also serves as a single-moded channel waveguide which propagates the ordinary ray (the linearly polarized light of the waveguide depth direction) through the regions 572a, 572b and 573.

Thus, the main channel waveguide 504 serves as a double-moded waveguide for the polarized light of the waveguide width direction (the extraordinary ray) and it serves as a single-moded waveguide for the polarized light of the waveguide depth direction (the ordinary ray).

In the laser scanning microscope according to the sixth embodiment, the arranging relation between the laser light source 501 and the substrate 503 is determined in such manner that the polarizing direction (the first polarizing direction) of the illuminating light emitted from the laser light source 501 coincides with the waveguide depth direction of the main channel waveguide 504.

Also, the reflected light from the object 509 is converted by the quarter-wave plate 506 to a linearly polarized light of the polarizing direction (the second polarizing direction) which coincides with the waveguide width direction of the main channel waveguide 504 and this linearly polarized light of the second polarizing direction is introduced into the main channel waveguide 504 from the optical port 505.

Thus, on one hand, the main channel waveguide 504 always propagates the illuminating light from the lasor light source 501 in the 0-order mode and emits it from the optical port 505. In this case, the light amount and phase of the illuminating light propagated in the 0-order mode are in the normal distribution so that when the illuminating light is reflected from the surface of the object 509, the reflected light contains only the differential information of the surface of the object 509. Also, since the branch channel waveguide 502 and the main channel waveguide 504 are both single-moded waveguides for the illuminating light, it is suffice that the branching portion 513 connecting the two is formed with such accuracy that the illuminating light is transmitted to the waveguide 504 from the waveguide 502 without causing any excessive shortage of light amount but with a sufficient transmission efficiency and therefore the formation of the branching portion 513 on the substrate 503 is relatively easy.

Also, since the main channel waveguide 504 functions as a double-moded waveguide for the reflected light incident to the optical port 505 from the object 509, the reflected light propagated in the double mode through the main channel waveguide 504 is distributed into the branch channel waveguides 510 and 511 by the branching portion 513 and therefore the differential information of the object surface contained in the reflected light can be taken out from the branch channel waveguides 510 and 511.

Then, the illuminating light emitted from the optical port 505 at the end face of the main channel waveguide 504 is the linearly polarized light in the depth direction of the waveguide 504 as mentioned previously. This illuminating light is converted to a circularly polarized light by passing through the quarter-wave plate 506, then passed through the scanner 507 and projected as a condensed light spot on the surface of the object 509 by the objective lens 508. The projection position of the condensed light spot is a position moved by tghe scanning of the scannor 507 and its control is effected by the controller 518.

Where there exists a positional inclination or a slope of the reflectance at the projection point of the condensed light spot on the surface of the object 509, there is caused an inclination corresponding to the phase distribution or the intensity distribution in the reflected light from the projection point. While this reflected light is a circularly polarized light, this circularly polarized light is passed through the objective lens 508 and the scanner 506 and again through the quarter-wave plate 506 (but in the direction reverse to the illuminating light) so that it is converted to a linearly polarized light (extraordinary ray) of a polarizing direction (waveguide width direction) perpendicular to the polarizing direction (waveguide depth direction) of the illuminating light emitted from the optical port 505 and it is then condensed on the optical port 505. Here, the optical port 505 of the main channel waveguide 504 performs the same spatial filter function as a pinhole for the light falling on the optial port 505 from the quarter-wave plate 506 and therefore the construction of this optical system constitutes a confocal laser scanning microscope.

Due to the slope of the phase distribution or the intensity distribution in the reflected light from the surface of the object 509, both the even mode and the odd mode are excited within the main channel waveguide 504 which propagates the extraordinary ray introduced into the said optical port. Due to the interference between the two modes, the light amounts respectively distributed into the branch channel waveguides 510 and 511 from the branching portion 513 are different from each other. The light amounts introduced into the branch channel waveguides 510 and 511 are respectively detected by the light detectors 514 and 515. The deviation between the output signals of the detectors 514 and 515 is produced by the differential circuit 516 so that the deviation signal generated from the differential circuit 516 is delivered to the controller 518 as a detection signal of the phase distribution of very small irregularities or the like or the intensity distribution of the reflectance variations or the like on the surface of the object 509.

Here, the length L of the double-moded waveguide for the extraordinary ray must be selected such that it satisfies the condition of the previously mentioned equation (1) when observing the phase distribution on the surface of the object 509 and it satisfies the condition of the previously mentioned equation (2) when observing the intensity distribution of the surface of the object 509, and these conditions can be selected by changing the voltage applied to the electrodes 512 as in the case of the previously mentioned fifth embodiment.

In the sixth embodiment shown in FIG. 16, the optical waveguide device 500 is constructed by forming the main channel waveguide 504, the central branch channel waveguides 502 and the side branch channel waveguides 510 and 511 on the surface of the substrate 503. In the production of this device, according to one embodiment, as shown in FIG. 17, Ti is diffused by the thermal diffusion process into the region of the central branch channel waveguide 502 and the regions 573, 572a and 572b of the main channel waveguide 54 on the substrate 503 made of a lithium niobate single crystal. In this thermal diffusion process, Ti is deposited on the respective regions on the substrate 503 after which the deposited Ti is diffused into the respective regions on the substrate 503 by a heat treatment for a required period of time within a high-temperature oven and a core of the Ti-diffused lithium niobate single crystal is formed in each of these regions.

Then, the regions of the branch channel waveguides 510 and 511 and the regions 71a, 71b, 72a and 72b of the main channel waveguide 504 on the substrate 504 are subjected to the proton exchange treatment. In this treatment, the portion of the substrate surface excluding these regions is masked by a resist after which the masked substrate 503 is immersed in a proton exchange treating solution and the ions in the substrate are exchanged with the ions in the solution in the respective regions, thereby forming a layer of a high refractive index in the vicinity of the surface of each region. It is to be noted that a solution of benzoic acid, silver nitrate, pirophosphoric acid or the like has been known for use as a proton exchange treating solution.

Thereafter, the resit is removed from the substrate surface and annealing is performed under predetermined heat treating conditions. By suitably selecting the heat treating conditions, the device is produced in which each of the regions has the desired refractive index and distribution thereof.

From the foregoing it well be seen that the optical waveguide device according to the present embodiment is designed to propagate an illuminating light and its reflected light whose polarizing directions are perpendicular to each other, and the main channel waveguide 504 showing anisotropy for the refractive index in these polarizing directions is adapted to function as a single-moded waveguide for the illuminating light and to function as a double-moded waveguide for the reflected light. As a result, in the main channel waveguide the illuminating light is always propagated in the 0-order mode. Also, since both of the central branch channel waveguide 502 and the main channel waveguide 504 function as single-moded waveguides for the illuminating light, there is no need for any measure for preventing the excitation of the first-order mode concerning the formation of the connecting portion of the two waveguides as in the past and it is only necessary to form the connecting portion (the branching portion) with such accuracy which ensures a satisfactory transmission efficiency of the propagating light amount between the two waveguides. As a result, the forming operation of the branching portion 513 on the substrate 503 is relatively easy and the optical waveguide device produced in this way can propagate the illuminating light only in the 0-order mode, thus making it possible to assemble a confocal laser scanning microscope at a relatively low cost.

While, in the above-described exemplary production of the optical waveguide device, the main channel waveguide 504 is constructed in such a manner that each of the Ti-diffused core and the proton-exchanged core is divided into the plurality of regions, on one hand, it is also possible to utilize only the anisotropy for the refractive index of the substrate material to form the core of a single region. For instance, in the Ti-diffused lithium niobate single crystal, as shown in the previously mentioned Talbe 1, the refractive index for the Z polarized light is 2.213 and the refractive index for the X or Y polarized light is 2.292 so that by increasing the refractive index of the substrate 503 constituting the cladding by any of the previously mentioned treatments or by strictly limiting the width dimension of the core, it is possible to form a waveguide which is a double-moded waveguide for the Z polarizing light and which is a single-moded waveguide for the X or Y polarized light.

Figure 18:
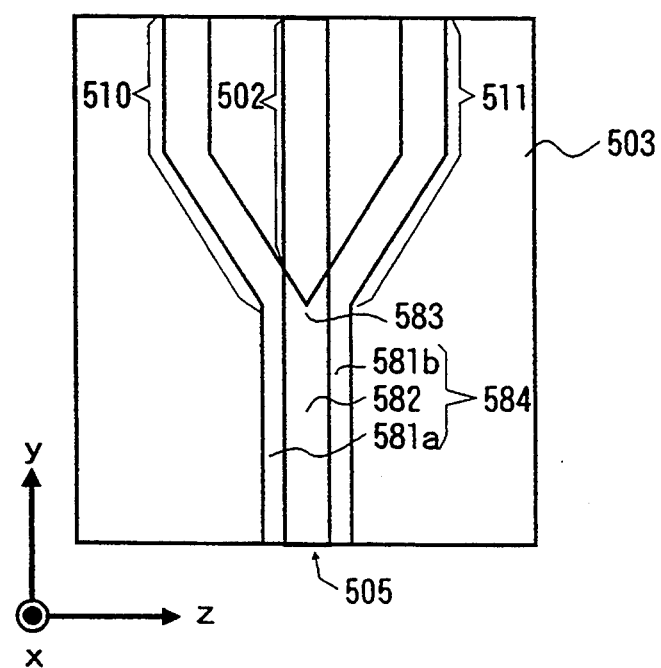
FIG. 18 is a plan view showing another example of the construction of the optical waveguide device used in the microscope according to the embodiment of FIG. 16.

FIG. 18 shows schematically the principal part of an optical waveguide device according to another exemplary production and this optical waveguide device is also usable in the confocal laser scanning differential interference microscope of the sixth embodiment. Note that in FIG. 18 the portions corresponding to the component parts in FIG. 17 are designated by the same reference numerals for the ease of explanation.

In the optical waveguide device shown in FIG. 18, a main channel waveguide 584, which is a double-moded waveguide for the extraordinary ray, is composed of a region 582 subjected to both the Ti diffusion treatment and the proton exchange treatment and regions 581a and 581b subjected to only the proton exchange treatment. A central branch channel waveguide 502 connected to the main waveguide channel 584 through a branching region 583 and left and right branch channel waveguides 510 and 511 are formed by the same forming process and constructional shapes as in the case of the optical waveguide device shown in the previously mentioned FIG. 17. Since only the refractive index for the extraordinary ray (the polarized light in the width direction of the waveguide) is increased in the regions subjected to the proton exchange treatment, the main channel waveguide 584 is not only a double-moded channel waveguide which propagates the extraordinary ray through the regions 581a, 581b and 582 but also a single-moded channel waveguide which propagates the ordinary ray through the region 582.

Describing hereunder the manner of the propagation of light through the respective waveguides of the optical waveguide device shown in FIG. 18, the laser beam emitted from the light source is introduced, as a linearly polarized light of the X axis direction in the rectangular coordinate representation in the Figure, into the central branch channel waveguide 502 from the substrate end face. Thus, the light propagating through the central branch channel waveguide 502 is the ordinary ray as mentioned previously. Since this propagating light is passed through the branch region 583 and propagated through the region 582 of the main channel waveguide 584 and since the region 582 functions as a single-moded waveguide for the ordinary ray propagating therethrough, the propagating light is composed of the 0-order moded light alone and this 0-order moded light is emitted as the illuminating light from the optical port 505 of the optical waveguide device toward the object 509 (FIG. 16).

On the other hand, the reflected light from the surface of the object 509 is returned to the optical port 505 as a polarized light of the Z axis direction which is perpendicular to the polarizing direction of the illuminating light emitted from the optical port 505 as mentioned previously. The light introduced into the main channel waveguide 584 from the optical port 505 is propagated in the 0-order mode and/or the first-order mode through the double-moded waveguide composed of the regions 581a, 581b and 582. Since the main channel waveguide 584 is a double-moded waveguide for the propagating light of the extraordinary ray as mentioned previously, the propagating light passed through the branching region 583 is distributed into and guided through the left and right branch channel waveguides 510 and 511 so as to arrive at the light detectors photo-coupled to the end portions of the waveguides 510 and 511.

Figure 19:
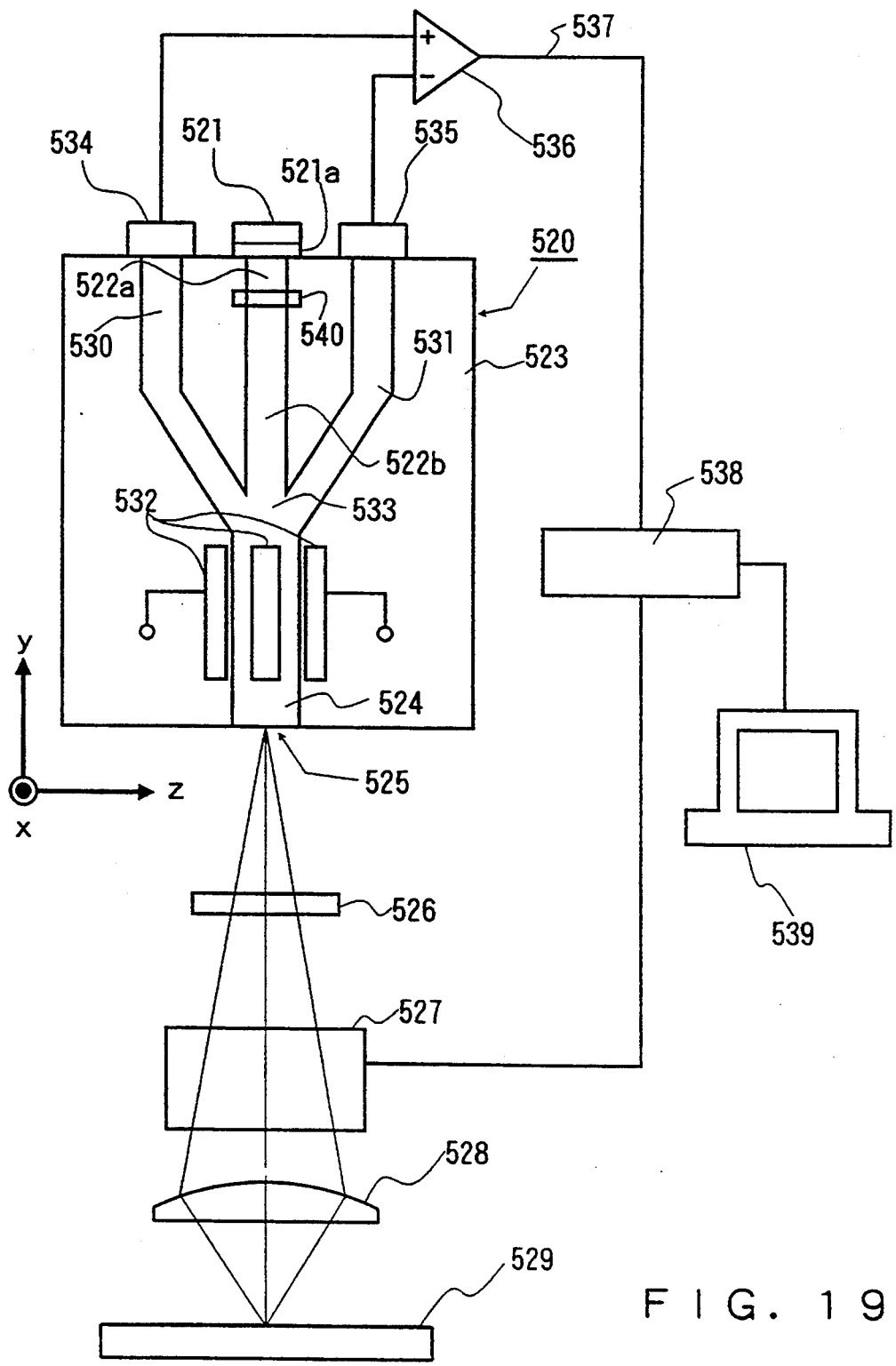
FIG. 19 is a block diagram showing the schematic construction of a confocal laser scanning differential interference microscope according to a seventh embodiment of the present invention.

FIG. 19 schematically shows the construction of a confocal laser scanning differential interference microscope according to a seventh embodiment of the present invention. The optical waveguide device 520 used in this embodiment is provided, on a lithium niobate single crystal substrate 523 having an electro-optic effect, with a series of central branch channel waveguides 522a and 522b for guiding an illuminating light to an object 529 to be detected, left and right branch channel waveguides 530 and 531 for detecting the reflected light from the object 529, and a main channel waveguide 524 connected to the branch channel waveguides 522b, 530 and 531 by a branching portion 533. The central branch channels 522a and 522b constitute substantially a series of single-moded channel waveguides and a polarizer 540 made of a metal cladding is arranged on the boundary portion of these waveguides whereby the backward light from the waveguide side is prevented from falling on a laser light source 521 by the polarizer 540. The polarizer 540 made of the metal cladding is itself well known and it absorbs the TM-moded light propagating through the waveguide but passes the TE-moded light through In this case, the laser light source 521 is a semiconductor laser and it is attached to the end of the waveguide 522a so as to ensure the maximum photo coupling efficiency with respect to the single-moded waveguide 522a formed on the substrate 523 whereby of the emitted laser beam entering into the waveguide 522a only the ordinary ray is propagated through this waveguide. In this case, since the polarizer 540 made of the metal cladding is arranged on the boundary portion of the waveguides 522a and 522b, the crystal orientation of the lithium niobate single crystal substrate 523 is the Z cut and the propagation mode of the ordinary ray propagated through the single-moded waveguide 522a is the TE mode. As a result, this TE-moded ordinary ray is guided to the single-moded waveguide 522b after passing through the polarizer 540 from the single-moded waveguide 522a, further passed through the branching portion 533, propagated through the main channel waveguide 524 and emitted from an optical port 525 as the illuminating light of the linearly polarized light polarized in the waveguide depth direction.

The illuminating light emitted from the optical port 525 is the linearly polarized light as mentioned previously and this illuminating light is passed through a quarter-wave plate 526 thereby converting it to a circularly polarized light. This illuminating light or the circularly polarized is passed through a scanner 527 and then it is condensed on the surface of an object 529 to be detected by an objective lens 528.

The reflected light from the light condensing point on the surface of the object 529 is returned to the quarter-wave plate 526 through the objective lens 528 and the scanner 527 and this reflected light is the circularly polarized light. This reflected light or the circularly polarized light is passed through the quarter-wave plate 526 in the reverse direction to the illuminating light so that it is converted to a linearly polarized light polarized in a direction perpendicular to the polarizing direction of the illuminating light and condensed as a light spot on the optical port 525. The projection position of this condensed light spot is a position which is movable by the scanning of the scanner 527 and its control is effected by a controller 528.

The light introduced into the main channel waveguide 524 from the optical port 525 is distributed into the branch channel waveguides 530 and 531 by the branching portion 533 and their light intensities are respectively detected by light detectors 534 and 535. On the other hand, the light reflected from the surface of the object 529 is passed through the branching portion 533 from within the main channel waveguide 524 and propagated through the central channel waveguide 522b; in this case, this propagating light is of the TM mode so that it is completely absorbed by the polarizer 540 without arriving at the single-moded waveguide 522a and therefore there is no danger of any backward light falling on the laser light source 521.

In this case, the power ratio of the light distributed into the left and right branch channel waveguides 530 and 531 is varied depending on the inclination of the surface of the object 529 so that by detecting the deviation between the outputs of the light detectors 534 and 535 by a differential amplifier 536, it is possible to produce a differential interference signal. A deviation signal 537 produced from the differential amplifier 536 is delivered to a controller 538 as a detection signal of the phase distribution for the minute irregularities or the like or the intensity distribution for the reflectance variations or the like on the surface of the object 529. In accordance with the deviation signal 537 and the projecting position information of the laser illuminating light from the scanner 527 the controller 538 produces an image signal of the differential information of the object 529 and this image signal is displayed by a display unit 539.

It is to be noted that electrodes 532 formed on the substrate 523 are arranged along the main channel waveguide 524 and the perfect coupling length of the main channel waveguide 524 can be varied by adjusting the applied voltage of the electrodes. As mentioned previously, the main channel waveguide 524 functions as a double-moded waveguide for the extraordinary ray and it also functions as a single-moded waveguide for the ordinary ray. Either of the constructions shown in the previously mentioned FIGS. 17 and 18 can be used as the construction of the main channel waveguide 524.

Figure 20:
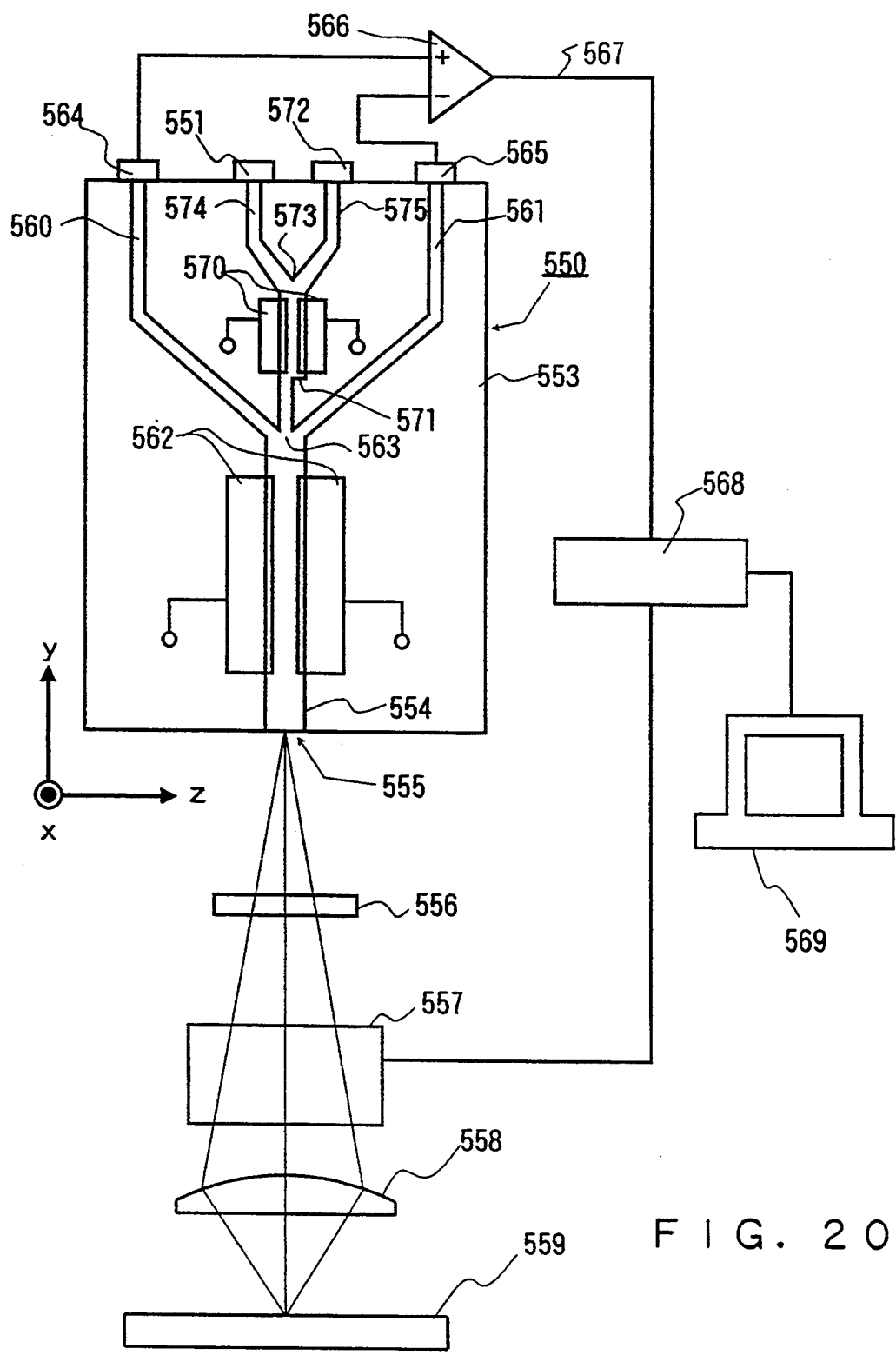
FIG. 20 is a block diagram showing the schematic construction of a confocal laser scanning differential interference microscope according to an eighth embodiment of the present invention.

Referring to FIG. 20, there is schematically illustrated a confocal laser scanning differential interference microscope according to an eighth embodiment of the present invention. The optical waveguide device 550 used in this embodiment includes a so-called mode splitter in a central branch channel waveguide 552 for guiding the illuminating light from a laser light source 551 in the single mode to a main channel waveguide 554.

In order to separate the polarized light of different modes from each other (the TE mode and the TM mode) and thereby to prevent the backward light from falling on the laser light source 551, the mode splitter includes a double-mode waveguide region 571 connected to the central branch channel waveguide 552 and its Y branching portion 573, and elecrodes 570 arranged along the double-moded waveguide region 571 for the fine adjustment of the mode splitting ratio by means of the applied voltage. Bifurcated from the Y branching portion 573 are a single-moded channel waveguide 574 for guiding the ordinary ray of the TE mode from the laser light source 551, and another single-moded channel waveguide 575 for guiding the extraordinary ray of the TM mode to a light detector 572.

This mode splitter is such that the ordinary ray of the TE mode propagated through the single-moded channel waveguide 574 from the laser light source 551 is passed only to the central branch channel waveguide 552 side from the branching portion 573 and conversely the extraordinary ray of the TM mode propagated from the central branch channel waveguide 552 is passed only to the other single-moded channel waveguide 575 side from the branching portion 573. It is to be noted that while the electrodes 570 of the mode splitter need not be provided depending on cercumstances, where the electrodes 570 are provided, the voltage applied to the electrodes 570 can be adjusted so as to eliminate any imperfectness of the TE/TM mode splitting characteristic due to the differences in characteristic among the different devices which may possibly be caused in the course of the production of the optical waveguide devices.

The laser light source 551 is a semiconductor laser and it is photo coupled to the end of the waveguide 574 in such a manner that a maximum photo coupling effect is ensured for the single-moded channel waveguide 574 which is formed on a lithium niobate single crystal substrate 553 having an electro-optic effect and thus the illuminating light propagated through the waveguide 574 consists of only the ordinary ray of the TE mode.

The illuminating light introduced into the single-moded channel waveguide 574 from the laser light source 551 is propagated as the ordinary ray of the TE mode and it is guided to the double-moded waveguide region 571 of the mode splitter from the branching portion 573. This ordinary ray is introduced into the central branch channel waveguide 552 from the double-moded waveguide 571 so that it is then passed through a branching portion 563, propagated in the single mode through the main channel waveguide 554 provided with complete coupling length adjusting electrodes 562 and emitted toward an object 559 to be detected from an optical port 555. Two branch channel waveguides 560 and 561 are connected, along with the central branch channel waveguide 552, to the branching portion 563 of the main channel waveguide 554, and the waveguides 560 and 561 are provided for the purpose of guiding the reflected light from the object 559 to light detectors 564 and 565, respectively, as in the case of the previously mentioned fifth embodiment.

The illuminating light emitted from the optical port 555 is a linearly polarized light which is polarized in the waveguide depth direction and this linearly polarized light is converted to a circularly polarized light due to its passage through a quarter-wave plate 556. This illuminating light or the circularly polarized light is passed through a scanner 557 and then condensed on the surface of the object 559 through an objective lens 558.

While the reflected light from the light condensing point on the surface of the object 559 is returned to the quarter-wave plate 556 through the objective lens 558 and the scanner 557, this reflected light is a circularly polarized light. The reflected light or the circularly plarized light is passed through the quarter-wave plate 556 in the reverse direction to the illuminating light so that it is converted to a linearly polarized light polarized in a direction perpendicular to the polarizing direction of the illuminating light and then condensed as a light spot on the optical port 555. The projection position of the condensed spot is a position movable by the scanning of the scanner 557 and its control is effected by a controller 568.

The light introduced into the main channel waveguide 554 from the optical port 555 is distributed into the two branch channel waveguides 560 and 561 through the branching portion 553 and their light intensities are respectively detected by the light detectors 564 and 565.

In this case, the power ratio of the light distributed into the left and right branch channel waveguides 560 and 561 is varied in accordance with the inclination of the surface of the object 559 so that if the deviation between the outputs of the light detectors 564 and 565 is detected by a differential amplifier 566, a differential interference signal is produced. The deviation signal 567 produced from the differential amplifier 566 is delivered to the controller 568 as a detection signal of the phase distribution of the minute irregularites or the like or the intensity distribution of the reflectance variations or the like of the surface of the object 559. The controller 568 produces an image signal for the differential information of the object 559 in accordance with the projecting position information of the laser illuminating light by the scanner 557 and the deviation signal 567 and this image signal is displayed on a display unit 569.

Also, the light reflected from the surface of the object 559 is passed through the branching portion 563 from within the main channel waveguide 554 and then propagated to the central channel waveguide 552; in this case, this propagating light has been converted to the ordinary ray of the TM mode when it is introduced into the double-moded channel waveguide 571 of the mode splitter. As a result, this light is never guided to the single-moded channel waveguide 574 on the light source side due to the function of the mode splitter so that the light is entirely guided to the single-moded channel waveguide 575 and its light intensity is monitored by the light detector 572. In this way, the backward light is prevented from falling on the laser light source 521 by way of the single-moded channel waveguide 574.

It is to be noted that while, in the above-described some embodiments and their modifications, the electrodes required for the adjustment of the effective coupling length of the main channel waveguide and the electrodes for adjusting the splitting ratio of the mode splitter are respectively in the form of the arrangement of a plurality of electrodes which are axially symmetric with respect to the associated waveguide channel, there are cases where any other optimum form of arrangement may be used in accordacne with the conditions of the substrate used including the orientations of the crystal axes of the single crystal substrate, etc.

Also, it is needless to say that it is possible to perform suitable electronic image processing operations on the deviation singal containing the differential information from the object surface to display images of many different contrasts.

Further, while the above-mentioned embodiments show the cases in which the optical scanner composed of a well known vibrating mirror, a rotary mirror or the like is used as means for moving the object to be detected and the illuminating light spot relative to each other and the surface of the object is scanned by the movement of the light spot by the scanner, instead it is possible to fix the light spot and move the object thereby effecting the scanning. For instance, while, in the case of moving the light spot by a vibrating mirror or a rotary mirror, it is presumable that there is the danger of making it difficult to strictly maintain the conjugate relation between the illuminating light spot on the object surface and the reflected light spot on the optical port of the optical waveguide device for receiving the reflected light of the illuminating light spot due to the effect of the residual aberration of the optical system, in such a case it will be more advantageous to effect the scanning by moving the object by the use of a movable stage or the like.

The present invention should not be understood restrictively on the basis of the foregoing embodiments and it should be construed that various modifications obvious to those skilled in the art fall within the technical scope of the present invention as defined by the accompanying claims.

We claim:

1. An optical waveguide device comprising:
   a light guiding core for guiding a first polarized light beam of a first polarizing direction and a second polarized light beam of a second polarizing direction which is perpendicular to the first polarizing direction, said light guiding core forming an optical waveguide, extending along a surface of a substrate, and being higher in refractive index than said substrate,
   said first polarizing direction being substantially the same as a depth direction of said optical waveguide,
   said second polarizing direction being substantially the same as a width direction of said optical waveguide,
   said light guiding core including a first core portion, higher in refractive index than said substrate with respect to both said first polarized light beam and said second polarized light beam, and a second core portion, higher in refractive index than said substrate with respect to only one of said first polarized light beam and said second polarized light beam,
   wherein said optical waveguide comprises a single-moded waveguide formed by said first core portion to propagate the other of said first polarized light beam and said second polarized light beam in a single mode, a double-moded waveguide formed by said first and second core portions to propagate said one of said first polarized light beam and said second polarized light beam in a double mode, and an optical port including both of one end face of said first core portion and one end face of said second core portion at one end face of said double-moded waveguide.

2. An optical waveguide device according to claim 1, wherein said substrate has an electro-optic effect, and further comprising an electrode for applying a predetermined electric field to said double-moded waveguide.

3. An optical waveguide device according to claim 1, wherein a center position of said single-moded waveguide and a center position of said double-moded waveguide are displaced from each other in said optical port.

4. An optical waveguide device according to claim 1, further comprising a second single-moded waveguide formed by said first core portion to externally guide the other of said first polarized light beam and said second polarized light beam into said single-moded waveguide, and third and fourth single-moded waveguides formed by said second core portion whereby the one of said first polarized light beam and said second polarized light beam within said double-moded waveguide is distributed into two parts according to a light intensity distribution thereof and guided to the outside.

5. A optical waveguide device for guiding light in a first direction extending from one end to the other end of an optical waveguide and in a second direction extending from the one end to the other end of said optical waveguide, said optical waveguide being formed along a surface of a single crystal substrate having an electro-optic effect by a light guiding core higher in refractive index than said substrate,
   wherein said optical waveguide includes a single-moded waveguide for propagating the light of said first direction in a single mode, a double-moded waveguide for propagating the light of said second direction in a double mode, and an optical port including both of one end face of said single-moded waveguide and one end face of said double-moded waveguide,
   a center of said single-moded waveguide and a center of said double-moded waveguide being displaced from each other within said optical port.

6. An optical waveguide device according to claim 5, further comprising electrode means for applying an electric field to said double-moded waveguide.

7. An optical waveguide device according to claim 5, further comprising a second single-moded waveguide for guiding an external light into said first single-moded waveguide along said first direction, and third and fourth single-moded waveguides whereby the light propagating along said second direction within said double-moded waveguide is distributed into two parts according to a light intensity distribution thereof and guided to the outside.

8. An optical instrument comprising:
   the optical waveguide device according to claim 1,
   illuminating means for projecting an illuminating light to said single-moded waveguide to emit an ordinary ray from said optical port,
   first condensing means for condensing said ordinary ray emitted from said optical port on a surface of a predetermined object to be detected,
   second condensing means for condensing a reflected light from said object surface on said optical port,
   polarizing means arranged between said optical port and said object surface whereby a polarizing direction of said ordinary ray from said optical port and a polarizing direction of said reflected light from said object surface cross each other at right angles,
   measuring means for measuring a light intensity distribution of said reflected light in said double-moded waveguide, and
   detecting means for detecting a deviation from in-focus of said ordinary ray condensed on said object surface by said first condensing means in accordance with a result of the measurement by said measuring means.

9. An optical instrument according to claim 8, further comprising electrode means for applying a predetermined electric field to said double-moded waveguide.

10. An optical instrument according to claim 8, wherein a center of said single-moded waveguide and a center of said double-moded waveguide are displaced from each other within said optical port.

11. An optical instrument according to claim 8,
    wherein said optical waveguide further includes:
    a second single-moded waveguide formed by said first core portion to guide said ordinary ray from said illuminating means to said first single-moded waveguide, third and fourth single-moded waveguides formed by said second core portion whereby the extraordinary ray in said reflected light in said double-moded waveguide is distributed into two parts according to a light intensity distribution thereof and guided to said measuring means, and wherein said measuring means includes a pair of detectors for respectively detecting intensities of the extraordinary rays emitted from said third and fourth single-moded waveguides.

12. An optical instrument according to claim 8, further comprising scanning means for moving a position of a light condensing point of said first condensing means on said object surface, and observation means for observing unevenness of said object surface in response to an output signal of said detecting means and a signal indicative of a scanning position by said scanning means.

13. An optical instrument comprising:
the optical waveguide device according to claim 5,
illuminating means for projecting an illuminating light to said single-moded waveguide along said first direction to emit said illuminating light from said optical port, first condensing means for condensing said illuminating light emitted from said optical port on a surface of a predetermined object to be detected, second condensing means for condensing a reflected light from said object surface on said optical port and propagating the same through said double-moded waveguide along said second direction, polarizing means arranged between said optial port and said object surface whereby a polarizing direction of said illuminating light from said optical port and a polarizing direction of said reflected light from said object surface cross each other at right angles, measuring means for measuring a light intensity distribution of said reflected light in said double-moded waveguide, and detecting means for detecting a deviation from in-focus of said illuminating light condensed on said object surface by said first condensing means in accordance with a result of the measurement by said measuring means.

14. An optical instrument according to claim 13, further comprising electrode means for applying an electric field to said double-moded waveguide.

15. An optical instrument according to claim 13, wherein said optical waveguide further includes a second single-moded waveguide for guiding the light from said illuminating means to said first single-moded waveguide along said first direction, and third and fourth single-moded waveguides whereby the light propagating in said second direction in said double-moded waveguide is distributed into two parts according to a light intensity distribution thereof and guided to the outside, and wherein said measuring means includes a pair of detectors for respectively detecting intensities of the light emitted from said third and fourth single-moded waveguides.

16. An optical instrument according to claim 13, further comprising scanning means for moving a position of a light condensing point of said first condensing means on said object surface, and observation means for observing unevenness of said object surface in response to an output signal from said detecting means and a signal indicative of a scanning position by said scanning means.

17. A confocal laser scanning optical microscope for producing a differential interference image of a surface of an object to be detected, said microscope comprising:

illuminating means for projecting an illuminating light containing a first linearly polarized light component of a predetermined first polarizing direction, detecting means for detecting a reflected light from said object surface, an optical waveguide device for guiding said illuminating light from said illuminating means toward said object surface and for guiding said reflected light from said object surface toward said detecting means, and polarized light conversion means arranged between said optical waveguide device and said object surface whereby said first linearly polarized light component of said illuminating light passed through said optical waveguide device is converted to a circularly polarized light and for converting a circularly polarized light component contained in said reflected light from said object surface to a second linearly polarized light of a second polarizing direction which is different from said first polarizing direction, said optical waveguide device including:
a main waveguide having at one end thereof a first optical port optically coupled to said polarized light conversion means, a branching portion for branching the other end of said main waveguide into three branch waveguides, said three branch waveguides including a central branch waveguide having at a terminal end thereof a second optical port optically coupled to said illuminating means, a first side branch waveguide arranged on one side of said central branch waveguide and having at a terminal end thereof a third optical port optically coupled to said detecting means, and a second side branch waveguide arranged on the other side of said central branch waveguide and having at a terminal end thereof a fourth optical port optically coupled to said detecting means, said central branch waveguide being formed as a single-moded waveguide whereby a the first linearly polarized light component of said illuminating light received at said second optical port is guided in a single mode and transmitted to said main waveguide, said main waveguide being formed as a single-moded waveguide for the first linearly polarized light component of said illuminating light transmitted from said central waveguide to guide the same in a single mode and emit from said first optical port and also as a double-moded waveguide for said second linearly polarized light of said reflected light introduced into said first optical port from said polarized light conversion means to propagate the same in a double mode and transmit to said branching portion, said branching portion distributing said second linearly polarized light transmitted from said main waveguide into said first side branch waveguide and said second side branch waveguide in accordance with a light intensity distribution thereof, and said first and second side branch waveguides respectively transmitting detection light corresponding to the light intensities of said second linearly polarized light distributed by said branching portion to said detecting means through said third and fourth optical ports.

18. A confocal laser scanning optical microscope according to claim 17, wherein said main waveguide is made of at least three material including an anisotropic material adapted to function as a core with respect to one of said first and second polarizing direction and to function as a cladding with respect to the other of said first and second polarizing directions.

19. A confocal laser scanning optical microscope according to claim 17, wherein said illuminating means includes a light source, and polarizing means for passing 000000 linearly polarized light of said first polarizing direction belonging to light emitted from said light source.

20. A confocal laser scanning optical microscope according to claim 17, wherein said central branch waveguide includes means for preventing said second linearly polarized light arriving at said first optical port from being introduced as a backward light into said illuminating means.

21. A confocal laser scanning optical microscope according to claim 17, wherein said main waveguide includes:

an $LiNbO_3$ single crystal functioning as a cladding, and an $LiNbO_3$ single crystal having a predetermined transition metal diffused thereinto and adapted to function as a core.

22. A confocal laser scanning optical microscope according to claim 17, wherein said main waveguide includes:

an $LiNbO_3$ single crystal functioning as a cladding with respect to said first and second linearly polarized light, an $LiNbO_3$ single crystal having a predetermined transition metal diffused thereinto and adapted to function as a core with respect to said first and second linearly polarized light, and a proton-exchanged $LiNbO_3$ single crystal adapted to function as a cladding with respect to said first linearly polarized light and to function as a core with respect to said second linearly polarized light.

23. A confocal laser scanning optical microscope according to claim 17, wherein a length L from the one end to the other end of said main waveguide and a perfect coupling length $L_c$ of an even mode and an odd mode for said second linearly polarized light in said main waveguide satisfy any of the following relations $L = m \cdot L_C (m = 1, 2, 3, \ldots)$ $L = L_C(2m+1)/2 (m = 0, 1, 2, \ldots)$.

24. A confocal laser scanning optical microscope according to claim 17, wherein said optical waveguide device further includes electrode means for applying an electric field to said main waveguide, wherein said main waveguide is made of a material having an electro-optic effect whereby a perfect coupling length $L_C$ of an even mode and an odd mode with respect to said second linearly polarized light in said main waveguide is selectively changed to a first controlled perfect coupling length $L_{C1}$ and a second controlled perfect coupling length $L_{C2}$ by said application of an electric field, and wherein a length L from the one end to the other end of said main waveguide and said first controlled perfect coupling length $L_{C1}$ or said second controlled perfect coupling leng $L_{C2}$ satisfy any of the following relations $L = mL_{C1}(m = 1, 2, 3, \ldots)$ $L = L_{C2}(2m+1)/2 (m = 0, 1, 2, \ldots)$.

25. An optical waveguide device according to claim 1, wherein said other of said first polarized light beam and said second polarized light beam is an ordinary ray, and wherein said one of said first polarized light beam and said second polarized light beam is an extraordinary ray.

26. An optical waveguide device according to claim 1, wherein a center position of said single-moded waveguide and a center position of said double-moded waveguide coincide with each other in said optical port.

27. An optical waveguide device according to claim 3, wherein said substrate has an electro-optic effect, and further comprising an electrode for applying a predetermined electric field to said double-moded waveguide.

28. An optical waveguide device according to claim 3, and further comprising a second single-moded waveguide formed by said first core portion to externally guide said other of said first polarized light beam and said second polarized light beam into said single-moded waveguide, and third and fourth single-moded waveguides formed by said second core portion so that said one of said first polarized light beam and said second polarized light beam within said double-moded waveguide is distributed into two parts according to a light intensity distribution thereof and guided to the outside.

* * * * *

UNITED STATES PATENT AND TRADEMARK OFFICE
CERTIFICATE OF CORRECTION

PATENT NO.: 5,452,382
DATED : September 19, 1995
INVENTOR(S): Takashi SHIONOYA, Jun IWASAKI, Hiroshi OHKI, Masaaki DOI It is certified that error appears in the above-identified patent and that said Letters Patent is hereby corrected as shown below:

On the title page, item [22], please correct the PCT filing date.

Delete "Jul. 25, 1994" and insert --Sep. 07, 1993--.

Signed and Sealed this

Twenty-third Day of January, 1996

Attest:

BRUCE LEHMAN

*Attesting Officer*     *Commissioner of Patents and Trademarks*